(12) United States Patent
Deng et al.

(10) Patent No.: US 9,419,407 B2
(45) Date of Patent: Aug. 16, 2016

(54) LASER ASSEMBLY AND INSPECTION SYSTEM USING MONOLITHIC BANDWIDTH NARROWING APPARATUS

(71) Applicant: KLA-Tencor Corporation, Milpitas, CA (US)

(72) Inventors: Yujun Deng, San Jose, CA (US); J. Joseph Armstrong, Fremont, CA (US); Yung-Ho Alex Chuang, Cupertino, CA (US); Vladimir Dribinski, Livermore, CA (US); John Fielden, Los Altos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/859,122

(22) Filed: Sep. 18, 2015

(65) Prior Publication Data

US 2016/0094011 A1    Mar. 31, 2016

Related U.S. Application Data

(60) Provisional application No. 62/136,403, filed on Mar. 20, 2015, provisional application No. 62/055,605, filed on Sep. 25, 2014.

(51) Int. Cl.
*G01J 1/42* (2006.01)
*H01S 3/137* (2006.01)
(Continued)

(52) U.S. Cl.
CPC .............. *H01S 3/137* (2013.01); *G01J 1/0411* (2013.01); *G01J 1/44* (2013.01); *H01S 3/005* (2013.01);
(Continued)

(58) Field of Classification Search
CPC ................ H01S 3/137; G01J 1/44; G01J 1/04
USPC ........................................................ 250/372
See application file for complete search history.

(56) References Cited

U.S. PATENT DOCUMENTS 4,178,561 A  12/1979  Hon et al.
4,467,189 A  8/1984  Tsuchiya
(Continued)

FOREIGN PATENT DOCUMENTS

CN   101702490 A   5/2010
DE   102007004235 B3   1/2008
(Continued)

OTHER PUBLICATIONS

Saikawa et al., "52 mJ narrow-bandwidth degenerated optical parametric system with a large-aperture periodically poled MgO:LiNbO3 device", Optics Letters, 31 (#21), 3149-3151 (2006).
(Continued)

*Primary Examiner* — David Porta
*Assistant Examiner* — Meenakshi Sahu
(74) *Attorney, Agent, or Firm* — Bever, Hoffman & Harms, LLP

(57) ABSTRACT

A pulsed UV laser assembly includes a partial reflector or beam splitter that divides each fundamental pulse into two sub-pulses and directs one sub-pulse to one end of a Bragg grating and the other pulse to the other end of the Bragg grating (or another Bragg grating) such that both sub-pulses are stretched and receive opposing (positive and negative) frequency chirps. The two stretched sub-pulses are combined to generate sum frequency light having a narrower bandwidth than could be obtained by second-harmonic generation directly from the fundamental. UV wavelengths may be generated directly from the sum frequency light or from a harmonic conversion scheme incorporating the sum frequency light. The UV laser may further incorporate other bandwidth reducing schemes. The pulsed UV laser may be used in an inspection or metrology system.

27 Claims, 10 Drawing Sheets

(51) Int. Cl.
*G01J 1/44* (2006.01)
*H01S 3/00* (2006.01)
*H01S 3/16* (2006.01)
*G01J 1/04* (2006.01)

(52) U.S. Cl.
CPC ............ *H01S 3/1611* (2013.01); *H01S 3/1643* (2013.01); *H01S 3/1671* (2013.01); *G01J 1/04* (2013.01); *G01J 2001/4238* (2013.01); *H01S 2301/08* (2013.01)

(56) References Cited

U.S. PATENT DOCUMENTS

| | | | |
|---|---|---|---|
| 5,108,176 A | 4/1992 | Malin et al. |
| 5,120,949 A | 6/1992 | Tomasetti |
| 5,144,630 A | 9/1992 | Lin |
| 5,189,481 A | 2/1993 | Jann et al. |
| 5,293,389 A | 3/1994 | Yano et al. |
| 5,377,001 A | 12/1994 | Malin et al. |
| 5,377,002 A | 12/1994 | Malin et al. |
| 5,563,702 A | 10/1996 | Emery et al. |
| 5,572,598 A | 11/1996 | Wihl et al. |
| 5,712,701 A | 1/1998 | Clementi et al. |
| 5,742,626 A | 4/1998 | Mead et al. |
| 5,760,899 A | 6/1998 | Eismann |
| 5,825,562 A | 10/1998 | Lai et al. |
| 5,998,313 A | 12/1999 | Sasaki et al. |
| 5,999,310 A | 12/1999 | Shafer et al. |
| 6,002,695 A | 12/1999 | Alfrey et al. |
| 6,002,697 A | 12/1999 | Govorkov et al. |
| 6,118,525 A | 9/2000 | Fossey et al. |
| 6,201,601 B1 | 3/2001 | Vaez-Iravani et al. |
| 6,212,310 B1 | 4/2001 | Waarts et al. |
| 6,249,371 B1 | 6/2001 | Masuda et al. |
| 6,271,916 B1 | 8/2001 | Marxer et al. |
| 6,373,869 B1 | 4/2002 | Jacob |
| 6,498,801 B1 | 12/2002 | Dudelzak et al. |
| 6,590,698 B1 | 7/2003 | Ohtsuki et al. |
| 6,608,676 B1 | 8/2003 | Zhao et al. |
| 6,816,520 B1 | 11/2004 | Tulloch et al. |
| 6,859,335 B1 | 2/2005 | Lai et al. |
| 6,888,855 B1 | 5/2005 | Kopf |
| 7,088,443 B2 | 8/2006 | Vaez-Iravani et al. |
| 7,098,992 B2 | 8/2006 | Ohtsuki et al. |
| 7,136,402 B1 | 11/2006 | Ohtsuki |
| 7,313,155 B1 | 12/2007 | Mu |
| 7,339,961 B2 | 3/2008 | Tokuhisa et al. |
| 7,345,825 B2 | 3/2008 | Chuang et al. |
| 7,352,457 B2 | 4/2008 | Kvamme et al. |
| 7,463,657 B2 | 12/2008 | Spinelli et al. |
| 7,471,705 B2 | 12/2008 | Gerstenberger et al. |
| 7,492,451 B2 | 2/2009 | Vaez-Iravani et al. |
| 7,525,649 B1 | 4/2009 | Leong et al. |
| 7,528,943 B2 | 5/2009 | Brown et al. |
| 7,586,108 B2 | 9/2009 | Nihtianov et al. |
| 7,593,437 B2 | 9/2009 | Staroudoumov et al. |
| 7,593,440 B2 | 9/2009 | Spinelli et al. |
| 7,609,309 B2 | 10/2009 | Brown et al. |
| 7,623,557 B2 | 11/2009 | Tokuhisa et al. |
| 7,627,007 B1 | 12/2009 | Armstrong et al. |
| 7,643,529 B2 | 1/2010 | Brown et al. |
| 7,715,459 B2 | 5/2010 | Brown et al. |
| 7,813,406 B1 | 10/2010 | Nguyen et al. |
| 7,822,092 B2 | 10/2010 | Ershov et al. |
| 7,920,616 B2 | 4/2011 | Brown et al. |
| 7,948,673 B2 | 5/2011 | Yoshimura et al. |
| 7,952,633 B2 | 5/2011 | Brown et al. |
| 7,957,066 B2 | 6/2011 | Armstrong et al. |
| 7,999,342 B2 | 8/2011 | Hsu et al. |
| 8,208,505 B2 | 6/2012 | Dantus et al. |
| 8,238,647 B2 | 8/2012 | Ben-Yishay et al. |
| 8,298,335 B2 | 10/2012 | Armstrong |
| 8,309,443 B2 | 11/2012 | Tanaka et al. |
| 8,319,960 B2 | 11/2012 | Aiko et al. |
| 8,391,660 B2 | 3/2013 | Islam |
| 8,503,068 B2 | 8/2013 | Sakuma |
| 8,629,384 B1 | 1/2014 | Biellak et al. |
| 8,665,536 B2 | 3/2014 | Armstrong |
| 8,686,331 B2 | 4/2014 | Armstrong |
| 8,755,417 B1 | 6/2014 | Dribinski |
| 8,824,514 B2 | 9/2014 | Armstrong |
| 8,873,596 B2 | 10/2014 | Dribinski |
| 8,896,917 B2 | 11/2014 | Armstrong |
| 8,929,406 B2 | 1/2015 | Chuang et al. |
| 8,976,343 B2 | 3/2015 | Genis |
| 2001/0000977 A1 | 5/2001 | Vaez-Iravani et al. |
| 2002/0109110 A1 | 8/2002 | Some et al. |
| 2002/0114553 A1 | 8/2002 | Mead et al. |
| 2002/0191834 A1 | 12/2002 | Fishbaine |
| 2003/0147128 A1 | 8/2003 | Shafer et al. |
| 2003/0161374 A1 | 8/2003 | Lokai |
| 2004/0080741 A1 | 4/2004 | Marxer et al. |
| 2005/0041702 A1 | 2/2005 | Fermann et al. |
| 2005/0110988 A1 | 5/2005 | Nishiyama et al. |
| 2005/0111081 A1 | 5/2005 | Shafer et al. |
| 2005/0128473 A1 | 6/2005 | Karpol et al. |
| 2005/0157382 A1 | 7/2005 | Kafka et al. |
| 2005/0254049 A1 | 11/2005 | Zhao |
| 2005/0254065 A1 | 11/2005 | Stokowski |
| 2006/0038984 A9 | 2/2006 | Vaez-Iravani et al. |
| 2006/0171656 A1 | 8/2006 | Adachi et al. |
| 2006/0239535 A1 | 10/2006 | Takada |
| 2006/0291862 A1 | 12/2006 | Kawai |
| 2007/0002465 A1 | 1/2007 | Chuang et al. |
| 2007/0047600 A1 | 3/2007 | Luo et al. |
| 2007/0103769 A1 | 5/2007 | Kuwabara |
| 2007/0146693 A1 | 6/2007 | Brown et al. |
| 2007/0211773 A1 | 9/2007 | Gerstenberger et al. |
| 2007/0223541 A1 | 9/2007 | Van Saarloos |
| 2007/0263680 A1 | 11/2007 | Staroudoumov et al. |
| 2007/0291810 A1 | 12/2007 | Luo et al. |
| 2008/0182092 A1 | 7/2008 | Bondokov |
| 2008/0186476 A1 | 8/2008 | Kusunose |
| 2008/0204737 A1 | 8/2008 | Ogawa |
| 2009/0084989 A1 | 4/2009 | Imai |
| 2009/0128912 A1 | 5/2009 | Okada |
| 2009/0180176 A1 | 7/2009 | Armstrong et al. |
| 2009/0185583 A1 | 7/2009 | Kuksenkov et al. |
| 2009/0185588 A1 | 7/2009 | Munroe |
| 2009/0296755 A1 | 12/2009 | Brown et al. |
| 2010/0085631 A1 | 4/2010 | Kusukame et al. |
| 2010/0188655 A1 | 7/2010 | Brown et al. |
| 2010/0278200 A1 | 11/2010 | Dicks et al. |
| 2010/0301437 A1 | 12/2010 | Brown et al. |
| 2011/0062127 A1 | 3/2011 | Gu et al. |
| 2011/0073982 A1 | 3/2011 | Armstrong et al. |
| 2011/0085149 A1 | 4/2011 | Nathan |
| 2011/0101219 A1 | 5/2011 | Uchiyama et al. |
| 2011/0123163 A1 | 5/2011 | Muller et al. |
| 2011/0134944 A1 | 6/2011 | Kaneda et al. |
| 2011/0222565 A1 | 9/2011 | Horain et al. |
| 2011/0228263 A1 | 9/2011 | Chuang et al. |
| 2011/0279819 A1 | 11/2011 | Chuang et al. |
| 2012/0026578 A1 | 2/2012 | Sakuma |
| 2012/0033291 A1 | 2/2012 | Kneip |
| 2012/0092657 A1 | 4/2012 | Shibata |
| 2012/0113995 A1 | 5/2012 | Armstrong |
| 2012/0120481 A1 | 5/2012 | Armstrong |
| 2012/0137909 A1 | 6/2012 | Hawes et al. |
| 2012/0314286 A1 | 12/2012 | Chuang et al. |
| 2013/0016346 A1 | 1/2013 | Romanovsky et al. |
| 2013/0021602 A1 | 1/2013 | Dribinski et al. |
| 2013/0064259 A1 | 3/2013 | Wakabayashi et al. |
| 2013/0077086 A1 | 3/2013 | Chuang et al. |
| 2013/0088706 A1 | 4/2013 | Chuang et al. |
| 2013/0176552 A1 | 7/2013 | Brown et al. |
| 2013/0194445 A1 | 8/2013 | Brown et al. |
| 2013/0264481 A1 | 10/2013 | Chern et al. |
| 2013/0313440 A1 | 11/2013 | Chuang et al. |
| 2014/0016655 A1 | 1/2014 | Armstrong |
| 2014/0050234 A1 | 2/2014 | Ter-Mikirtychev |
| 2014/0071520 A1 | 3/2014 | Armstrong |
| 2014/0111799 A1 | 4/2014 | Lei et al. |
| 2014/0133503 A1* | 5/2014 | Peng .................. H01S 3/06754 |

(56) References Cited

U.S. PATENT DOCUMENTS

| | | | |
|---|---|---|---|
| 2014/0153596 | A1 | 6/2014 | Chuang et al. |
| 2014/0158864 | A1 | 6/2014 | Brown et al. |
| 2014/0204963 | A1 | 7/2014 | Chuang et al. |
| 2014/0226140 | A1 | 8/2014 | Chuang et al. |
| 2014/0291493 | A1 | 10/2014 | Chuang et al. |
| 2015/0007765 | A1 | 1/2015 | Dribinski |
| 2015/0177159 | A1 | 6/2015 | Brown et al. |
| 2015/0200216 | A1 | 7/2015 | Muramatsu et al. |
| 2015/0268176 | A1* | 9/2015 | Deng ............... G01N 21/9501 250/372 |
| 2015/0275393 | A1 | 10/2015 | Bondokov et al. |
| 2015/0294998 | A1 | 10/2015 | Nihtianov |
| 2015/0372466 | A1 | 12/2015 | Tamai et al. |

372/25

FOREIGN PATENT DOCUMENTS

| | | |
|---|---|---|
| DE | 102009047098 A1 | 5/2011 |
| EP | 0532927 A2 | 3/1993 |
| EP | 0746871 B1 | 5/2000 |
| EP | 0602983 B1 | 6/2000 |
| EP | 1072938 A2 | 1/2001 |
| EP | 1194804 B1 | 7/2003 |
| EP | 1939917 A2 | 7/2008 |
| EP | 2013951 A2 | 1/2009 |
| JP | H0511287 A | 1/1993 |
| JP | 2002-258339 A | 9/2002 |
| JP | 2003043533 A | 2/2003 |
| JP | 2006-60162 A | 3/2006 |
| JP | 2006071855 | 3/2006 |
| JP | 200786108 | 4/2007 |
| JP | 2007-206452 A | 8/2007 |
| JP | 2007298932 A | 11/2007 |
| JP | 2009-145791 A | 7/2009 |
| JP | 2010-54547 A | 3/2010 |
| JP | 2010-256784 A | 11/2010 |
| JP | 2011-23532 A | 2/2011 |
| JP | 2011-128330 A | 6/2011 |
| WO | 9532518 A1 | 11/1995 |
| WO | 9617372 A1 | 6/1996 |
| WO | 97/45902 | 2/1997 |
| WO | 03/069263 A2 | 8/2003 |
| WO | 2005/022705 A2 | 3/2005 |
| WO | 2009/082460 A2 | 7/2009 |
| WO | 2010/037106 A2 | 4/2010 |
| WO | 2012/154468 A2 | 11/2012 |
| WO | 2013/015940 A2 | 1/2013 |
| WO | 2014067754 A2 | 5/2014 |

OTHER PUBLICATIONS

Sakuma et al., "True CW 193.4-nm light generation based on frequency conversion of fiber amplifiers", Optics Express 19 (#16), 15020-15025 (2011).

Sakuma et al., "High power, narrowband, DUV laser source by frequency mixing in CLBO", Advanced High-Power Lasers and Applications, Nov. 2000, pp. 7-14, Ushio Inc.

Mead et al., "Solid-state lasers for 193-nm photolithography", Proc. SPIE 3051, Optical Microlithography X, pp. 882-889 (Jul. 7, 1997).

Zavartsev et al. "High efficient diode pumped mixed vanadate crystal Nd:Gd0.7Y0.3VO4 laser", International Conference on Lasers, Applications, and Technologies 2007: Advanced Lasers and Systems, Valentin A. Orlovich et al. ed., Proc. of SPIE vol. 6731, 67311P (2007), 5 pages.

International Search Report and Written Opinion dated May 13, 2014 for PCT/US2014/012902, filed Jan. 24, 2014 in the name of KLA-Tencor Corporation.

KLA-Tencor Corporation; PCT International Search Report dated Dec. 29, 2015 for Application No. PCT/US2015/051538, 3 pages.

Huang, Qiyu et al., "Back-Side Illuminated Photogate CMOS Active Pixel Sensor Structure With Improved Short Wavelength Response", IEEE Sensors Journal, vol. 11, No. 9, Sep. 2011, 5 pages.

Itzler, Mark et al., "InP-based Geiger-mode avalanche photodiode arrays for three-dimensional imaging at 1.06 μm", Proceedings of SPIE, vol. 7320 (2000), 12 pages.

Niclass, Cristiano et al., "Design and Characterization of a CMOS 3-D Image Sensor Based on Single Photon Avalanche Diodes", IEEE Journal of Solid-State Circuits, vol. 40, No. 9, Sep. 2005, 8 pages.

Paetzel, Rainer et al., "Activation of Silicon Wafer by Excimer Laser" 18th IEEE Conf. Advanced Thermal processing of Semiconductors—RTP 2010, 5 pages.

Stevanovic, Nenad et al., "A CMOS Image Sensor for High-Speed Imaging", 2000 IEEE Int'l. Conference Solid-State Circuits, 3 pages.

Dulinski, Wojciech et al., "Tests of a backside illuminated monolithic CMOS pixel sensor in an HPD set-up", Nuclear Instruments and Methods in Physics Research A 546 (2005) 274-280, 7 pages.

Sarubbi, F et al, "Pure boron-doped photodiodes: a solution for radiation detection in EUV lithography", Proceedings of the 38th EP Solid-State Device Research Conf., Edinburgh Int'l. Conf. Centre, Endiburgh, Scotland, UK, Sep. 15-19, 2008, Piscataway, NJ: IEEE, US, pp. 278-281.

Dianov et al. "Bi-doped fiber lasers: new type of high-power radiation sources", Conference on Lasers and Electro-Optics, May 6-11, 2007, 2 pages.

Kalita et al. "Multi-watts narrow-linewidth all fiber Yb-doped laser operating at 1179 nm", Optics Express, 18 (6), pp. 5920-5925 (2010).

Kashiwagi et al. "Over 10W output linearly-polarized single-stage fiber laser oscillating above 1160 nm using Yb-doped polarization-maintaining solid photonic bandgap fiber", IEEE Journal of Quantum Electronics, 47 (8), pp. 1136-1141 (2011).

Sasaki et al. "Progress in the growth of a CsLiB6O10 crystal and its application to ultraviolet light generation", Optical Materials, vol. 23, 343-351 (2003).

Shirakawa et al. "High-power Yb-doped photonic bandgap fiber amplifier at 1150-1200nm", Optics Express 17 (2), 447-454 (2009).

Ter-Mikirtychev et al. "Tunable LiF:F2-color center laser with an intracavity integrated-optic output coupler", Journal of Lightwave Technology, 14 (10), 2353-2355 (1996).

Yoo et al. "Excited state absorption measurement in bismuth-doped silicate fibers for use in 1160 nm fiber laser", 3rd EPS-QEOD Europhoton Conference, Paris, France, Aug. 31-Sep. 5, 2008, 1 page.

International Search Report and Written Opinion dated Jul. 11, 2014 for PCT/US2014/030989, filed Mar. 18, 2014 in the name of KLA-Tencor Corporation.

International Search Report and Written Opinion dated May 20, 2014 for PCT/US2014/016198, filed Feb. 13, 2014 in the name of KLA-Tencor Corporation.

KLA-Tencor Corporation, filed U.S. Appl. No. 14/248,045, filed Apr. 8, 2014 and entitled "Passivation of Nonlinear Optical Crystals".

KLA-Tencor Corporation, filed U.S. Appl. No. 62/059,368, filed Oct. 3, 2014 and entitled "183nm Laser and Inspection System".

KLA-Tencor Corpoation, filed U.S. Appl. No. 14/210,355, filed Mar. 13, 2014 and entitled "193nm Laser and an Inspection System Using a 193nm Laser".

Raoult, F. et al., "Efficient generation of narrow-bandwidth picosecond pulses by frequency doubling of femtosecond chirped pulses", Jul. 15, 1998 / ol. 23, No. 14 / Optics Letters, pp. 1117-1119.

Herriott, et al., "Folded Optical Delay Lines", Applied Optics 4, #8, pp. 883-889 (1965).

Herriott, et al., "Off-Axis Paths in Spherical Mirror Interferometers", Applied Optics 3, #4, pp. 523-526 (1964).

Mod et al.: "New Nonlinear Optical Crystal: Cesium Lithium Borate", Appl. Phys. Lett. 67, No. 13, Sep. 25, 1995, pp. 1818-1820.

Boyd, G. D. et al., "Parametric Interaction of Focused Gaussian Light Beams", Journal of Applied Physics, vol. 39, No. 8, Jul. 1968, 13 pages.

Lopez, L., et al., "Multimode squeezing properties of a confocal optical parametric oscillator: Beyond the thin-crystal approximation", Physical Review A 72, 013806 (2005 The American Physical Society), 10 pages.

Fu, Xiaoqian, "Higher Quantum Efficiency by Optimizing GaN Photocathode Structure", 978-1-4244-6644-3/10/ © 2010 IEEE, pp. 234-235.

(56) References Cited

OTHER PUBLICATIONS

Sakic, Agata, "Boron-layer silicon photodiodes for high-efficiency low-energy electron detection", Solid-State Electronics 65-66 (2011), pp. 38-44.

Omatsu, Takashige et al., "High repetition rate Q-switching performance in transversely diode-pumped Nd doped mixed gadolinium yttrium vanadate bounce laser", Optics Express vol. 14, Issue 7, pp. 2727-2734, Apr. 3, 2006.

* cited by examiner

LASER ASSEMBLY AND INSPECTION SYSTEM USING MONOLITHIC BANDWIDTH NARROWING APPARATUS

PRIORITY APPLICATION

The present application claims priority to U.S. Provisional Patent Application 62/055,605 entitled "Method for Reducing the Bandwidth of an Ultra-violet Laser and an Inspection System and Method Using an Ultra-violet Laser", filed by Deng et al. on Sep. 25, 2014, and also claims priority to U.S. Provisional Patent Application 62/136,403 entitled "Method for Reducing the Bandwidth of an Ultra-violet Laser and an Inspection System and Method Using an Ultra-violet Laser", filed by Deng et al. on Mar. 20, 2015.

RELATED APPLICATIONS

The present application is related to U.S. patent application Ser. No. 14/158,615, entitled "193 nm Laser and Inspection System", filed by Chuang et al. on Jan. 17, 2014, U.S. patent application Ser. No. 13/797,939, entitled "Solid-State Laser and Inspection System Using 193 nm Laser", filed by Chuang et al. on Mar. 12, 2013, U.S. patent application Ser. No. 14/170,384, entitled "193 nm Laser and Inspection System", filed by Chuang et al. on Jan. 31, 2014, U.S. patent application Ser. No. 13/711,593, entitled "Semiconductor Inspection and Metrology System Using Laser Pulse Multiplier", filed by Chuang et al. on Dec. 11, 2012, U.S. patent application Ser. No. 13/487,075, entitled "Semiconductor Inspection and Metrology System Using Laser Pulse Multiplier", filed by Chuang et al. on Jun. 1, 2012, and U.S. patent application Ser. No. 14/300,227, entitled "A System and Method for Reducing the Bandwidth of a Laser and an Inspection System and Method Using a Laser", filed by Deng et al. on Jun. 14, 2014. All these applications are incorporated by reference herein.

BACKGROUND OF THE DISCLOSURE

1. Field of the Disclosure

The present application relates to lasers suitable for generating radiation at deep UV (DUV) and vacuum UV (VUV) wavelengths, and to methods for generating laser light at DUV and VUV wavelengths. In particular it relates to systems and methods for reducing and controlling the spectral bandwidth of DUV and VUV lasers. The lasers are particularly suitable for use in inspection systems including those used to inspect photomasks, reticles, and semiconductor wafers.

2. Related Art

The integrated circuit industry requires inspection tools with increasingly higher sensitivity to detect ever smaller defects and particles whose sizes may be about 100 nm or smaller. Furthermore these inspection tools must operate at high speed in order to inspect a large fraction, or even 100%, of the area of photomask, reticle or wafer, in a short period of time, e.g. one hour or less.

Generally short wavelengths such as DUV and VUV wavelengths have higher sensitivity for detecting small defects compared with longer wavelengths. Inspection of a photomask or reticle is preferably done using the same wavelength as used the lithography used when printing from the photomask or reticle. Currently a wavelength of substantially 193.4 nm is used for the most critical lithography steps and a wavelength of substantially 248 nm for less critical lithography steps. Where a wavelength value is mentioned herein without qualification, it should be assumed that value refers to the vacuum wavelength of the light or radiation.

High-speed inspection requires high power lasers in order to illuminate the samples being inspected with high intensity in order to detect the small amount of light scattered from small particles or defects or allow detection of small changes in reflectivity due to defects in the pattern. The required laser power levels may range from approximately 100 mW for the inspection of photomasks and reticles up to more than 10 W for the detection of small particles and imperfections on a bare silicon wafer.

Typically inspection in the semiconductor industry requires lasers with very narrow bandwidth. Such inspection systems usually use an objective lens with a large field of view (typically from a few hundred microns to a few mm in dimensions) in order to allow imaging of a large area to achieve high inspection speeds. An objective lens with low distortions and a large field of view is expensive and complex. Requiring that objective lens to operate over a large bandwidth (such as more than a few tens of μm) significantly increases the cost and complexity. DUV lasers with bandwidths of approximately 20 μm or less are very desirable for inspection applications in the semiconductor industry.

DUV lasers are known in the art. U.S. Pat. No. 5,144,630 entitled "Multiwave Solid State Laser Using Frequency Conversion Techniques" that issued on Sep. 1, 1992 to Lin and U.S. Pat. No. 5,742,626, entitled "Ultraviolet Solid State Laser Method Of Using Same And Laser Surgery Apparatus", issued on Apr. 21, 1998 to Mead et al. describe exemplary DUV lasers. Fourth and fifth harmonics are generated from a pulsed fundamental infra-red laser operating at a wavelength near 1064 nm, thereby resulting in wavelengths of approximately 266 nm and 213 nm. Lin and Mead also teach generating an infra-red wavelength longer than 1064 nm from the fundamental laser using an optical parametric oscillator (OPO).

The output bandwidth of a laser oscillator is determined by its intra-cavity dynamics. In prior-art pulsed lasers, to further reduce laser bandwidth, various bandwidth limiting devices, such as an etalon, a birefringent filter, or an optical grating, have been incorporated into a laser cavity. Because all of these approaches are invasive, they inevitably introduced detrimental effects to the lasers. These detrimental effects include extra power losses and greater complexity, which often led to lower laser efficiency, poor thermal stability, tighter misalignment sensitivity, and longer laser system warm-up time. Furthermore, because intra-cavity beam size is often small and predetermined by the laser cavity design, and intra-cavity laser power density is normally much higher than laser output power, these intra-cavity components are much more susceptible to damage.

In prior-art pulsed DUV lasers, the bandwidth of the DUV output depends directly on the bandwidth of the fundamental infra-red laser. That is, the broader the bandwidth of the fundamental laser, the broader the DUV broader the DUV output bandwidth. Reducing the bandwidth of a laser requires redesigning the laser oscillator cavity. Since the cavity may control many properties of the laser including bandwidth, repetition rate, as well as average and peak powers, redesigning the cavity to reduce the bandwidth while maintaining the other laser parameters may be a complex and time consuming task. Furthermore it may not be possible to achieve a specific DUV laser bandwidth specification using a readily available infra-red fundamental laser.

Reducing bandwidth by frequency doubling by combining two femtosecond pulses with opposite chirp is known in the art (see Raoult et al., Opt. Lett. 23, 1117-1119 (1998)). A femtosecond pulse was first chirped and stretched to about 1ns using a grating-pair stretcher and then, after amplification, split into two pulses. The two pulses were incompletely compressed into tens of picosecond pulses with opposite chirp by using two grating-pair dispersers. Sum frequency generation of these two pulses resulted in a much narrower bandwidth. However, this approach relies on grating-based stretchers and compressors, which are bulky and lack the mechanical stability needed for demanding commercial industrial applications. Furthermore femtosecond pulses are generally unsuited to use in semiconductor inspection applications as the wide bandwidth (multiple nm) greatly complicates the design of the system optics, and the high peak power can easily damage the article being inspected.

Therefore, a need arises for DUV laser overcoming some, or all, of the above disadvantages. In particular a need arises for a means of reducing or controlling the bandwidth of a DUV laser, including DUV lasers with pulse lengths of between a few picoseconds and a few hundred picoseconds.

SUMMARY OF THE DISCLOSURE

The present invention is generally directed to bandwidth narrowing apparatus and methods that facilitate reducing and/or controlling the bandwidth of output laser light by way of dividing fundamental laser light pulses into two sub-pulses, stretching and adding opposite chirps to the two sub-pulses using one or more monolithic optical devices (e.g., one or more chirped volume Bragg gratings or chirped fiber Bragg gratings), and then recombining (mixing) the stretched/chirped sub-pulses to produce sum frequency (output) light made up of pulses having frequencies that are equal to two times the fundamental frequency (i.e., where the pulses have wavelengths that are equal to one-half of the fundamental laser light pulses' fundamental wavelength). According to an aspect of the invention, mixing of the two sub-pulses is performed using a sum frequency module configured such that the opposite (positive and negative) chirps of the two stretched/chirped sub-pulses are canceled during the sum frequency mixing process, thereby producing sum frequency output light having a much narrower bandwidth than is produced by direct second harmonic generation. An advantage of generating sum frequency output light in this manner is that this approach wastes very little of the fundamental laser power, as compared with methods that use a filter or etalon simply to reject unwanted wavelengths.

According to exemplary embodiments of the present invention, a laser assembly includes a fundamental laser and a bandwidth narrowing apparatus generally made up of a pulse dividing element, a single monolithic device (e.g., a monolithic chirped volume Bragg grating (monolithic CBG)), a frequency mixing module, and additional optical elements (e.g., mirrors, polarizing beam splitters, quarter-wave plates (QWPs) and fold mirrors) operably arranged to provide sub-pulse light paths between the pulse dividing element and the monolithic device and between the monolithic device and the frequency mixing module. The fundamental laser (e.g., a Nd:YAG or a Nd-doped vanadate laser including, in one embodiment, a second-harmonic conversion module) generates fundamental light made up of pulses having a frequency disposed within a fundamental frequency bandwidth. The bandwidth narrowing apparatus is disposed downstream of the fundamental laser (i.e., outside of the laser cavity) in order to avoid the detrimental effects of intra-cavity bandwidth-controlling devices, and also to facilitate maintaining other laser parameters (i.e., other than the bandwidth) without having to redesign the laser oscillator cavity. Specifically, the pulse dividing element (e.g., a partial reflector or beam splitter) is disposed to receive the fundamental laser light, and is configured to divide each fundamental laser light pulse into a pair of corresponding (first and second) sub-pulses having approximately equal energies. In a presently preferred embodiment, the two sub-pulses are respectively directed along separate light paths onto opposite surfaces of the monolithic device, whereby two oppositely chirped stretched sub-pulses are generated that are mirror images of each other (i.e., such that the two stretched sub-pulses have changes in frequency with time that are approximately equal in magnitude but opposite in sign). The use of a single monolithic device in this manner provides superior optical and mechanical stability, and occupies only a fraction of the space compared with grating-based stretcher and compressor approaches, and guarantees that the two stretched sub-pulses are chirped with substantially mirror-image pulse frequency patterns. Furthermore, a properly designed CBG has much higher dispersion than grating-based stretcher and compressor, can be used to stretch narrow-bandwidth picosecond pulses, which remains very challenging to do with gratings due to the lack of angular dispersion from gratings. The two stretched, oppositely chirped sub-pulses are then directed along separate light paths to the frequency mixing module. The two sub-pulse light paths between the pulse dividing element and the frequency mixing module are preferably arrange matched to within about 10% of the pulse length, and the optical elements (e.g., mirrors) forming the light paths can be easily repositioned to change the relative time delay between the two stretched sub-pulses arriving at the frequency mixing module, thereby facilitating fine-tuning of the center wavelength of the sum-frequency output pulses, which is beneficial for some applications requiring a precise specific wavelength, such as 193 nm light for photo-mask inspection. The sum frequency module (e.g., a BBO, LBO or CLBO crystal that is configured for either Type I or Type II frequency mixing, or a periodically poled non-linear crystal such as lithium niobate or stoichiometric lithium tantalate, SLT) is configured to mix the corresponding positively-chirped and negatively-chirped stretched sub-pulses such that the resulting sum frequency pulses have center frequencies equal to two times the fundamental frequency (e.g., such that the sum frequency pulses have center wavelengths equal to one of approximately 532 nm and approximately 266 nm).

According to alternative specific embodiments, the bandwidth narrowing apparatuses of various laser assemblies utilize different optical element arrangements to achieve different advantages. For example, in one approach, the optical elements forming the two sub-pulse light paths are configured such that the two stretched sub-pulses have substantially orthogonal polarizations and enter the frequency mixing module along collinear paths, and the frequency mixing module is configure to mix the two stretched sub-pulses using Type II frequency mixing techniques. This orthogonal-polarization-collinear-path approach simplifies the optical arrangement and causes the stretched sub-pulses to overlap while passing through the frequency mixing module, which results in efficient generation of sum frequency light as a second harmonic of the fundamental laser light. In an alternative approach, the optical elements forming the two sub-pulse light paths are configured such that the two stretched sub-pulses have substantially parallel polarizations and enter the frequency mixing module at an acute relative angle (e.g., less than about 4°). This parallel-polarization-non-collinear-path approach provides the advantage of facilitating Type I mixing, which is more efficient than Type II mixing, and thus facilitates either the use of shorter length crystals or the generation of more output power (i.e., for a given input power and crystal length). The parallel-polarization-non-collinear-path approach may perform frequency mixing in a periodically polled crystal, such as periodically poled lithium niobate (PPLN) or periodically poled SLT (PPSLT). Periodically poled crystals may have higher non-linear coefficients than materials such as LBO, BBO and CLBO, and may be used in longer crystals, allowing more efficient conversion of the first harmonic into the second harmonic.

According to additional alternative specific embodiments, laser assemblies of the present invention utilize the CGB-based bandwidth narrowing apparatuses mentioned above in combination with at least one of a harmonic conversion module, an optical bandwidth filtering device and an additional frequency mixing module to achieve laser output light exhibiting the reduced and/or controlled bandwidth described above, where the additional structures facilitate generating the laser output light at a higher (i.e., above 2×) harmonic of a fundamental light frequency (i.e., above a second harmonic of the fundamental frequency). In one exemplary embodiment, a DUV laser assembly utilizes one of the CGB-based bandwidth narrowing apparatuses described above to generate sum frequency light at the second harmonic of the fundamental light, and then passes the sum frequency light through a harmonic conversion module to generate laser output light at a higher (e.g., fourth) harmonic of the fundamental light. In another exemplary embodiment, a DUV laser assembly directs fundamental light into an optical bandwidth filtering device (e.g., an etalon) that reflects a first (rejected) portion of each fundamental light pulse having frequencies that are outside a narrow bandwidth, and passes a second portion of each fundamental light pulse including frequencies within the narrow bandwidth. The rejected first portion of each fundamental light pulse, which in conventional systems would be discarded and thus wasted, is passed through one of the CGB-based bandwidth narrowing apparatuses described above, whereby the previously unusable out-of-band frequencies of the first portion are converted into usable sum frequency light having frequencies within the narrow bandwidth. The sum frequency light is then passed through an optional harmonic conversion module, and then either the sum frequency light or the (first) harmonic light exiting the optional harmonic conversion module is passed to a second frequency mixing module. The second frequency mixing module is configured to mix the sum frequency light (or the optional first harmonic) with the second fundamental light portion (i.e., the narrow bandwidth portion passed by the optical bandwidth filtering device) or a harmonic thereof to produce laser output light having a higher harmonic and higher energy than could be produced without using the CGB-based bandwidth narrowing apparatus.

An exemplary inspection system is described. This inspection system includes an illumination source, optics, and a detector. The illumination source includes a DUV laser assembly that utilizes the CGB-based bandwidth narrowing apparatus mentioned above (i.e., a pulse dividing element, one or more monolithic devices, a frequency mixing module and associated optical elements) to generate DUV radiation of a desired wavelength and bandwidth. The optics are configured to direct and focus the DUV radiation from the illumination source onto a sample. The sample is supported by a stage, which moves relative to the optics during the inspection. The detector is configured to receive reflected or scattered light from the sample, wherein the optics are further configured to collect, direct, and focus the reflected or scattered light onto the detector. The detector includes one or more image sensors. At least one image sensor may be a time-delay integration (TDI) sensor.

The exemplary inspection system may include one or more illumination sources that illuminate the sample from different angles of incidence and/or different azimuth angles and/or with different wavelengths and/or polarization states, wherein one or more of the illumination sources incorporate the novel bandwidth control approach described above. The exemplary inspection system may include one or more collection paths that collect light reflected or scattered by the sample in different directions and/or are sensitive to different wavelengths and/or to different polarization states. The exemplary inspection system may include a TDI sensor with readout circuits on two sides that are used to read out two different signals simultaneously. The exemplary inspection system may include an electron-bombarded image sensor.

An exemplary method of inspecting a sample is described. The exemplary method includes directing and focusing radiation from a DUV laser illumination source onto the sample, wherein the DUV laser illumination source is configured to implement bandwidth control in the manner described above. The sample is supported by a stage, which moves relative to the optics during the inspection. The method further includes using optics to collect, direct, and focus light reflected or scattered by the sample onto a detector. The detector includes one or more image sensors. At least one image sensor is a time-delay integration (TDI) sensor. The method further includes controlling the bandwidth of the DUV laser with a chirped volume Bragg grating (CBG).

DETAILED DESCRIPTION OF THE DRAWINGS

The present invention relates to an improvement in sensors for semiconductor inspection systems. The following description is presented to enable one of ordinary skill in the art to make and use the invention as provided in the context of a particular application and its requirements. As used herein, directional terms such as "underneath", "upward", "downward", "vertical" and "horizontal" are intended to provide relative positions or orientations for purposes of description, and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
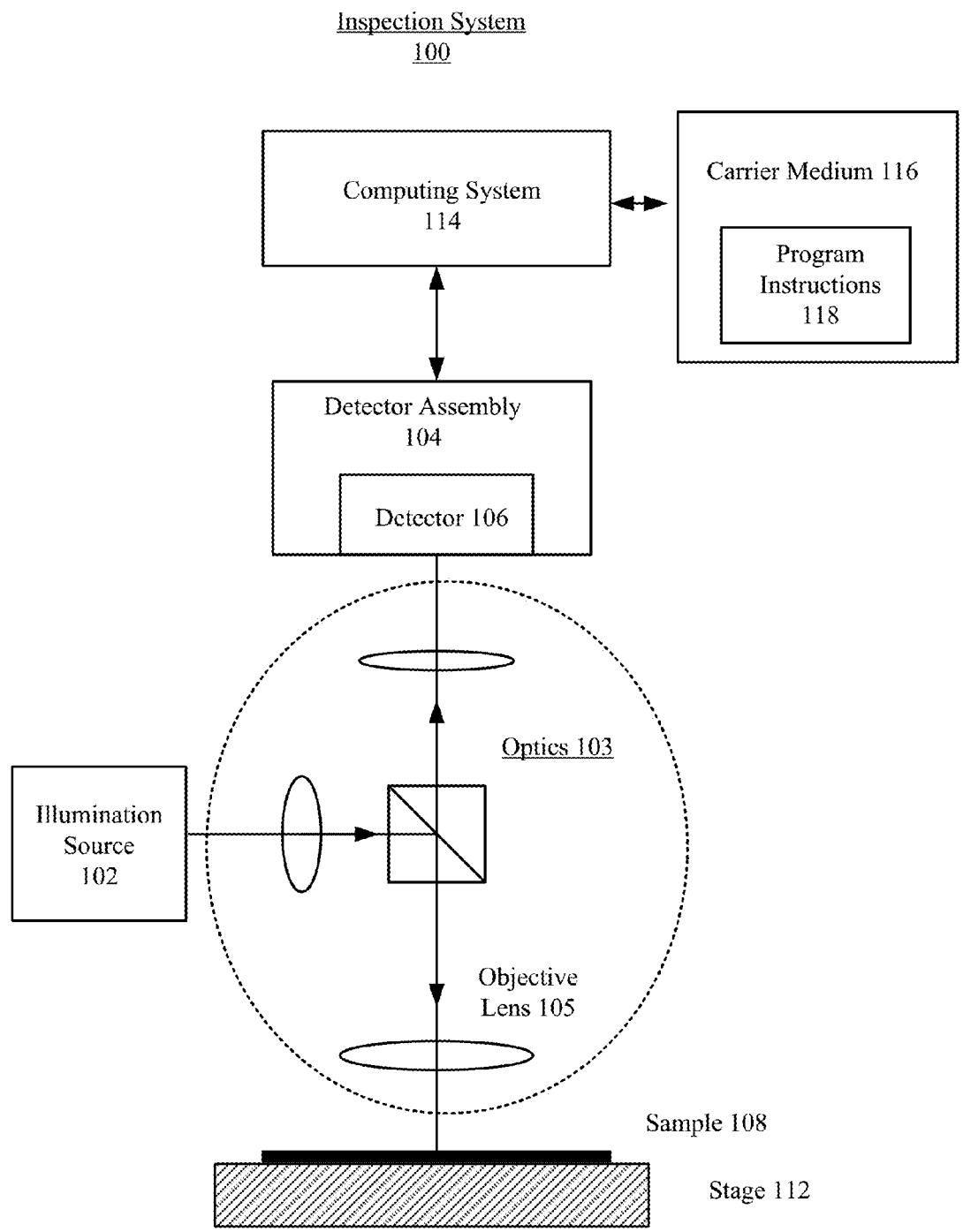
FIG. 1 illustrates an exemplary inspection system incorporating an illumination source that comprises a DUV laser.

FIG. 1 illustrates an exemplary inspection system 100 configured to measure a sample 108 such as a wafer, reticle, or photomask. Sample 108 is placed on a stage 112 in order to facilitate movement of different regions of sample 108 underneath the optics. Stage 112 may comprise an X-Y stage or an R-θ stage. In some embodiments, stage 112 can adjust the height of sample 108 during inspection to maintain focus. In other embodiments, an objective lens 105 can be adjusted to maintain focus.

An illumination source 102 may comprise one or more lasers and/or a broad-band light source. Illumination source 102 may emit DUV radiation and/or VUV radiation (collectively referred to herein as "UV radiation"). Illumination source 102 includes at least one fundamental laser configured to generate the UV radiation, wherein the fundamental laser incorporates the bandwidth control described herein, and is positioned to direct the UV radiation as a beam that passes through an optical system (optics) 103 to sample 108. Optics 103 including an objective lens 105 configured to direct UV radiation towards, and focuses it on, sample 108. Optics 103 may also comprise mirrors, lenses, and/or beam splitters. A portion of the UV radiation (referred to below as "light") that is redirected (i.e., reflected or scattered) from sample 108 is collected, directed, and focused by optics 103 onto a detector 106, which is disposed within a detector assembly 104.

Detector assembly 104 includes a detector 106. Detector 106 may include a two-dimensional array sensor or a one-dimensional line sensor. In one embodiment, the output of detector 106 is provided to a computing system 114, which analyzes the output. Computing system 114 is configured by program instructions 118, which can be stored on a carrier medium 116.

One embodiment of inspection system 100 illuminates a line on sample 108, and collects scattered and/or reflected light in one or more dark-field and/or bright-field collection channels. In this embodiment, the detector 106 may include a line sensor or an electron-bombarded line sensor.

Another embodiment of inspection system 100 illuminates multiple spots on sample 108, and collects scattered and/or reflected light in one or more dark-field and/or bright-field collection channels. In this embodiment, the detector 106 may include a two-dimensional array sensor or an electron-bombarded two-dimensional array sensor.

Additional details of various embodiments of inspection system 100 can be found in U.S. Published Patent Application 2013/0016346, entitled "WAFER INSPECTION", by Romanovsky et al. which published on Jan. 17, 2013, U.S. Published Patent Application 2009/0180176, by Armstrong et al., which published on Jul. 16, 2009, U.S. Published Patent Application 2007/0002465 by Chuang et al., which published on Jan. 4, 2007, U.S. Pat. No. 5,999,310, by Shafer et al., which issued on Dec. 7, 1999, and U.S. Pat. No. 7,525,649 by Leong et al., which issued on Apr. 28, 2009. All of these patents and patent applications are incorporated by reference herein.

Figure 2A:
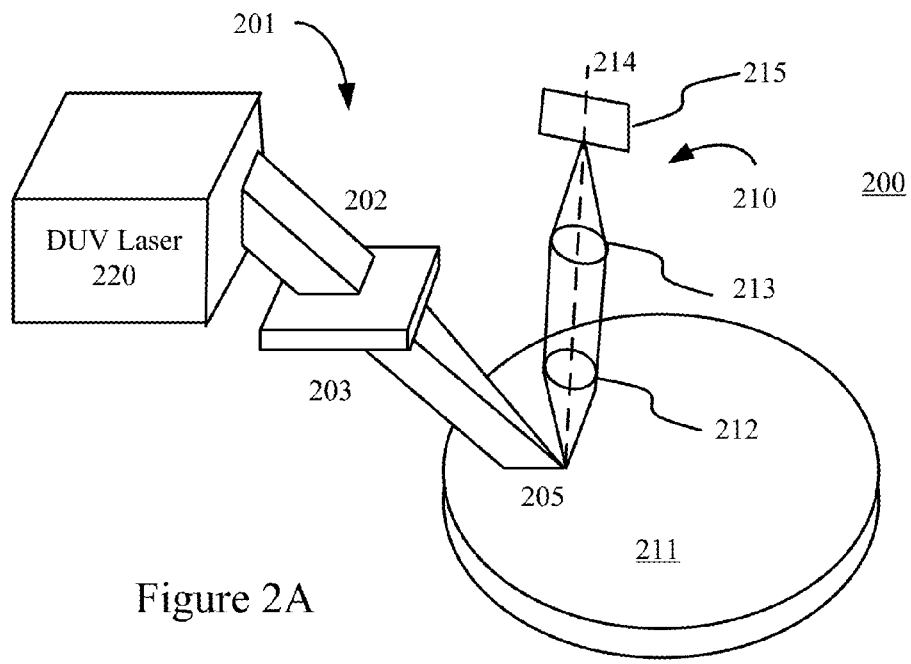
FIGS. 2A and 2B illustrate an exemplary inspection system using line illumination with one, or more, collection channels and a DUV laser.
Figure 2B:
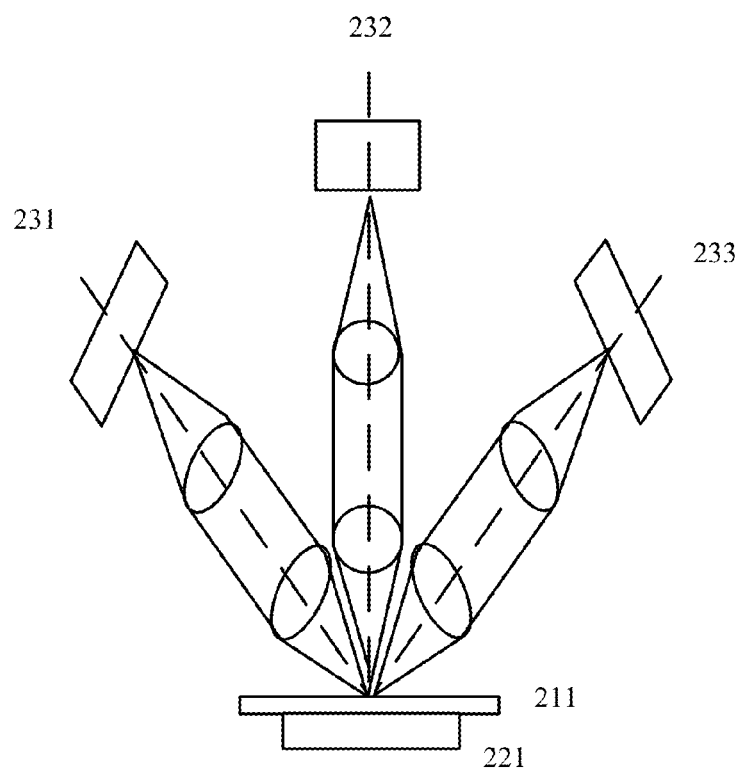

FIGS. 2(A) and 2(B) illustrate aspects of dark-field inspection systems that incorporate one of the laser assemblies and/or method described herein in accordance with other exemplary embodiments of the present invention. In FIG. 2(A), illumination optics 201 comprises a DUV laser system 220 with bandwidth control as described herein generating light 202 that is focused by mirror or lens 203 into a line 205 on the surface of the wafer or photomask (sample) 211 being inspected. Collection optics 210 directs light scattered from line 205 to sensor 215 using lenses and/or mirrors such as 212 and 213. The optical axis 214 of the collection optics is not in the illumination plane of line 205. In some embodiments, axis 214 is approximately perpendicular to the line 205. Sensor 215 comprises an array sensor, such as a linear array sensor.

FIG. 2(B) illustrates one embodiment of multiple dark-field collection systems (231, 232 and 233, respectively) each substantially similar to the collection optics 210 of FIG. 2(A). Collection systems 231, 232 and 233 are used in combination with illumination optics substantially similar to illumination optics 201 in FIG. 2(A). Sample 211 is supported on stage 221, which moves the areas to be inspected underneath the optics. Stage 221 may comprise an X-Y stage or an R-θ stage, which preferably moves substantially continuously during the inspection in order to inspect large areas of the sample with minimal dead time.

More details of inspection systems in accordance with the embodiments illustrated in FIGS. 2(A) and 2(B) can be found in U.S. Pat. No. 7,525,649, entitled "Surface inspection system using laser line illumination with two dimensional imaging", issued on Apr. 28, 2009, and U.S. Pat. No. 6,608,676, entitled "System for detecting anomalies and/or features of a surface", issued on Aug. 19, 2003. Both of these patents are incorporated by reference herein.

Figure 3:
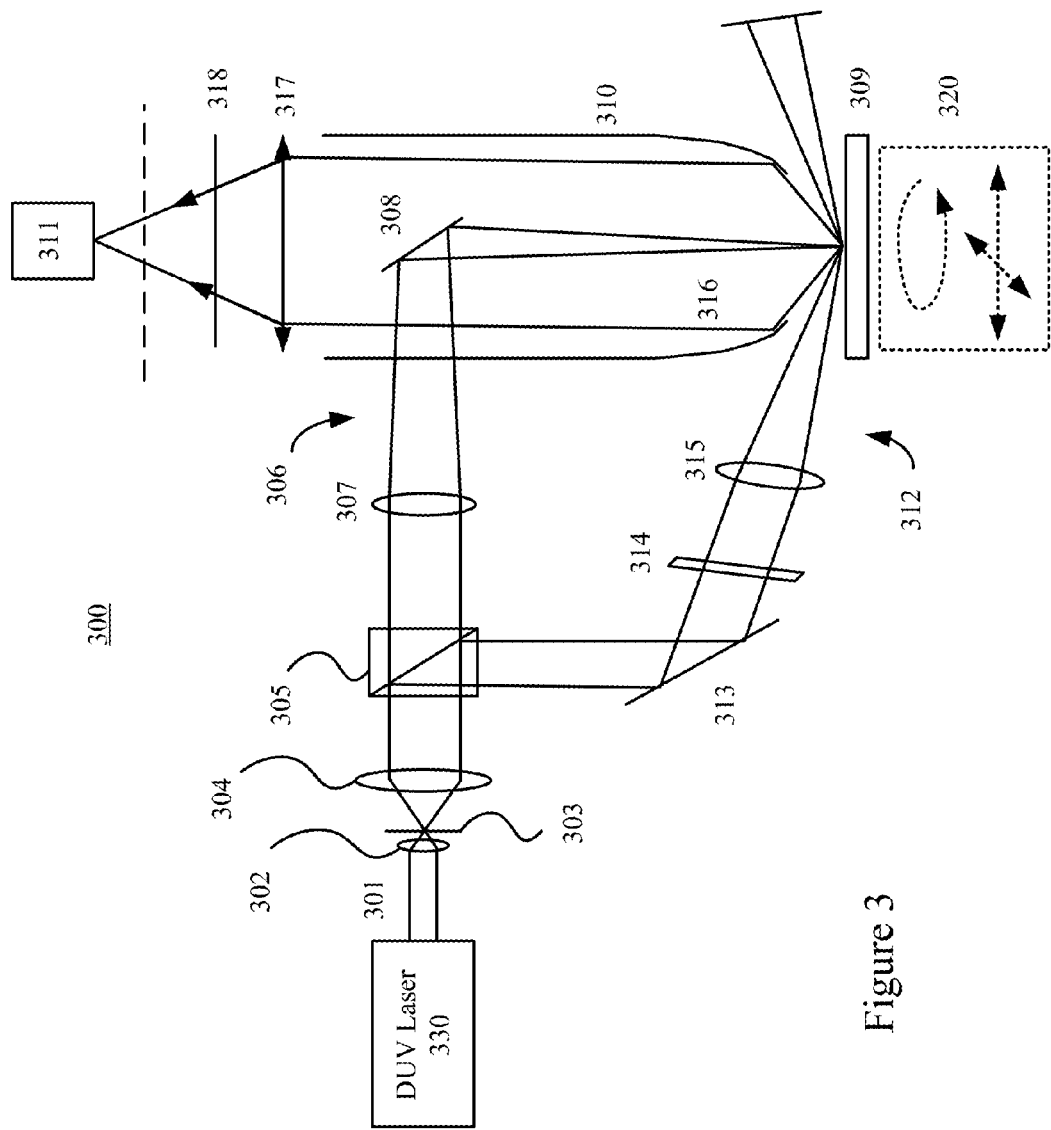
FIG. 3 illustrates an exemplary inspection system with normal and oblique illumination.

FIG. 3 illustrates an inspection system 300 configured to detect particles or defects on a sample using both normal and oblique illumination beams. In this configuration, a DUV laser system 330 incorporating bandwidth control as described herein provides a laser beam 301. A lens 302 focuses the beam 301 through a spatial filter 303. Lens 304 collimates the beam and conveys it to a polarizing beam splitter 305. Beam splitter 305 passes a first polarized component to the normal illumination channel and a second polarized component to the oblique illumination channel, where the first and second components are orthogonal. In the normal illumination channel 306, the first polarized component is focused by optics 307 and reflected by mirror 308 towards a surface of a sample 309. The radiation scattered by sample 309 (such as a wafer or photomask) is collected and focused by a paraboloidal mirror 310 to a sensor 311.

In the oblique illumination channel 312, the second polarized component is reflected by beam splitter 305 to a mirror 313 which reflects such beam through a half-wave plate 314 and focused by optics 315 to sample 309. Radiation originating from the oblique illumination beam in the oblique channel 312 and scattered by sample 309 is collected by paraboloidal mirror 310 and focused to sensor 311. The sensor and the illuminated area (from the normal and oblique illumination channels on surface 309) are preferably at the foci of the paraboloidal mirror 310.

The paraboloidal mirror 310 collimates the scattered radiation from sample 309 into a collimated beam 316. Collimated beam 316 is then focused by an objective 317 and through an analyzer 318 to the sensor 311. Note that curved mirrored surfaces having shapes other than paraboloidal shapes may also be used. An instrument 320 can provide relative motion between the beams and sample 309 so that spots are scanned across the surface of sample 309. U.S. Pat. No. 6,201,601, which issued on Mar. 13, 2001 and is incorporated by reference herein, describes inspection system 300 in further detail.

Figure 4:
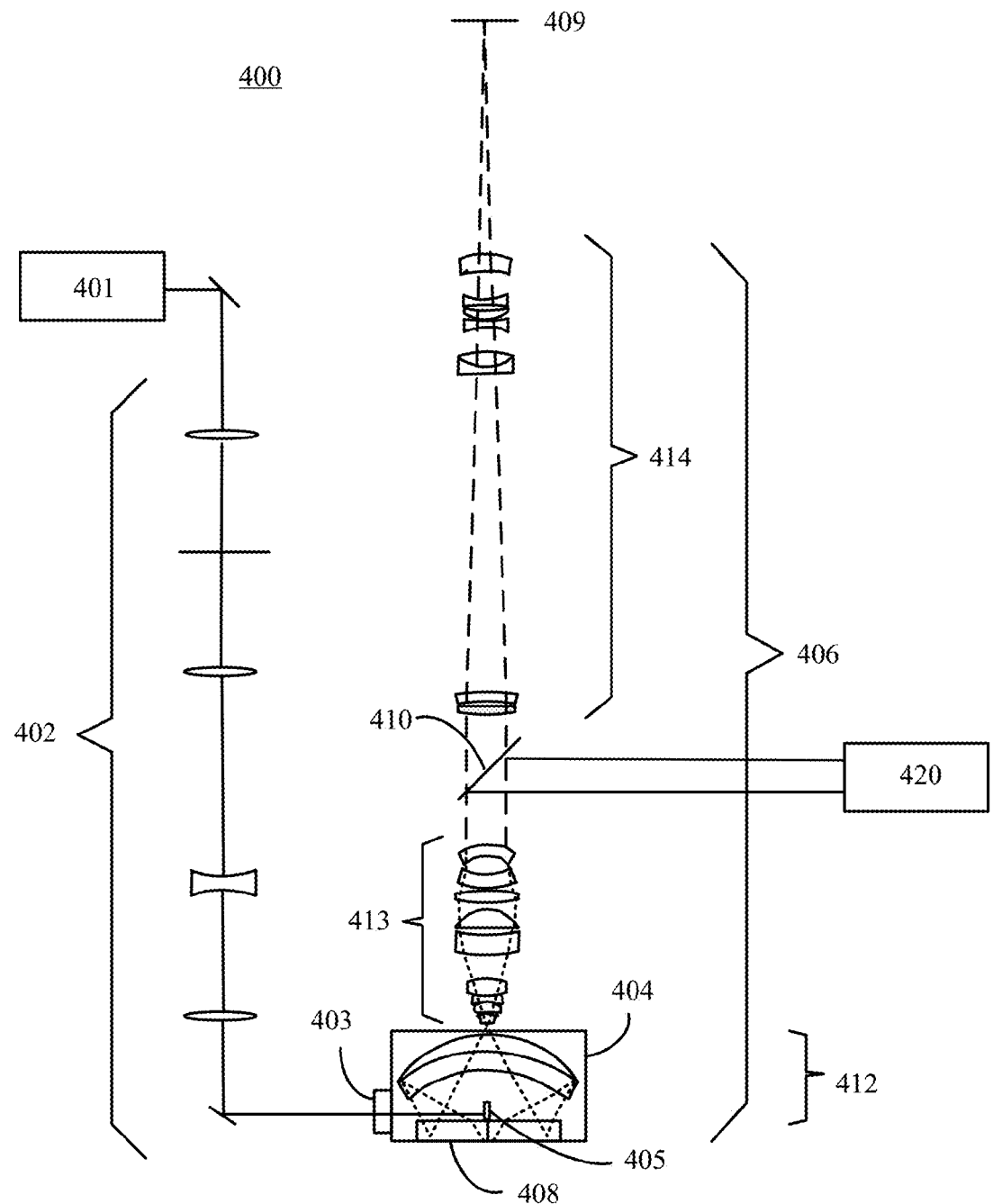
FIG. 4 illustrates an exemplary inspection system with bright-field and dark-field illumination channels.

FIG. 4 illustrates an exemplary catadioptric imaging system 400 configured as an inspection system with bright-field and dark-field inspection modes. System 400 may incorporate two illuminations sources: a laser system 401, and a broad-band light illumination module 420.

In a dark-field mode, adaptation optics 402 control the laser illumination beam size and profile on the surface being inspected. Mechanical housing 404 includes an aperture and window 403, and a prism 405 to redirect the laser along the optical axis at normal incidence to the surface of a sample 408. Prism 405 also directs the specular reflection from surface features of sample 408 out of objective 406. Objective 406 collects light scattered by sample 408 and focuses it on sensor 409. Lenses for objective 406 can be provided in the general form of a catadioptric objective 412, a focusing lens group 413, and a tube lens section 414, which may, optionally, include a zoom capability. Laser system 401 incorporates bandwidth control as described herein.

In a bright-field mode, broad-band illumination module 420 directs broad-band light to beam splitter 410, which reflects that light towards focusing lens group 413 and catadioptric objective 412. Catadioptric objective 412 illuminates the sample 408 with the broadband light. Light that is reflected or scattered from the sample is collected by objective 406 and focused on sensor 409. Broad-band illumination module 420 comprises, for example, a laser-pumped plasma light source or an arc lamp. Broad-band illumination module 420 may also include an auto-focus system to provide a signal to control the height of sample 408 relative to catadioptric objective 412.

Published US Patent Application 2007/0002465, which published on Jan. 4, 2007 and is incorporated by reference herein, describes system 400 in further detail.

Figure 5:
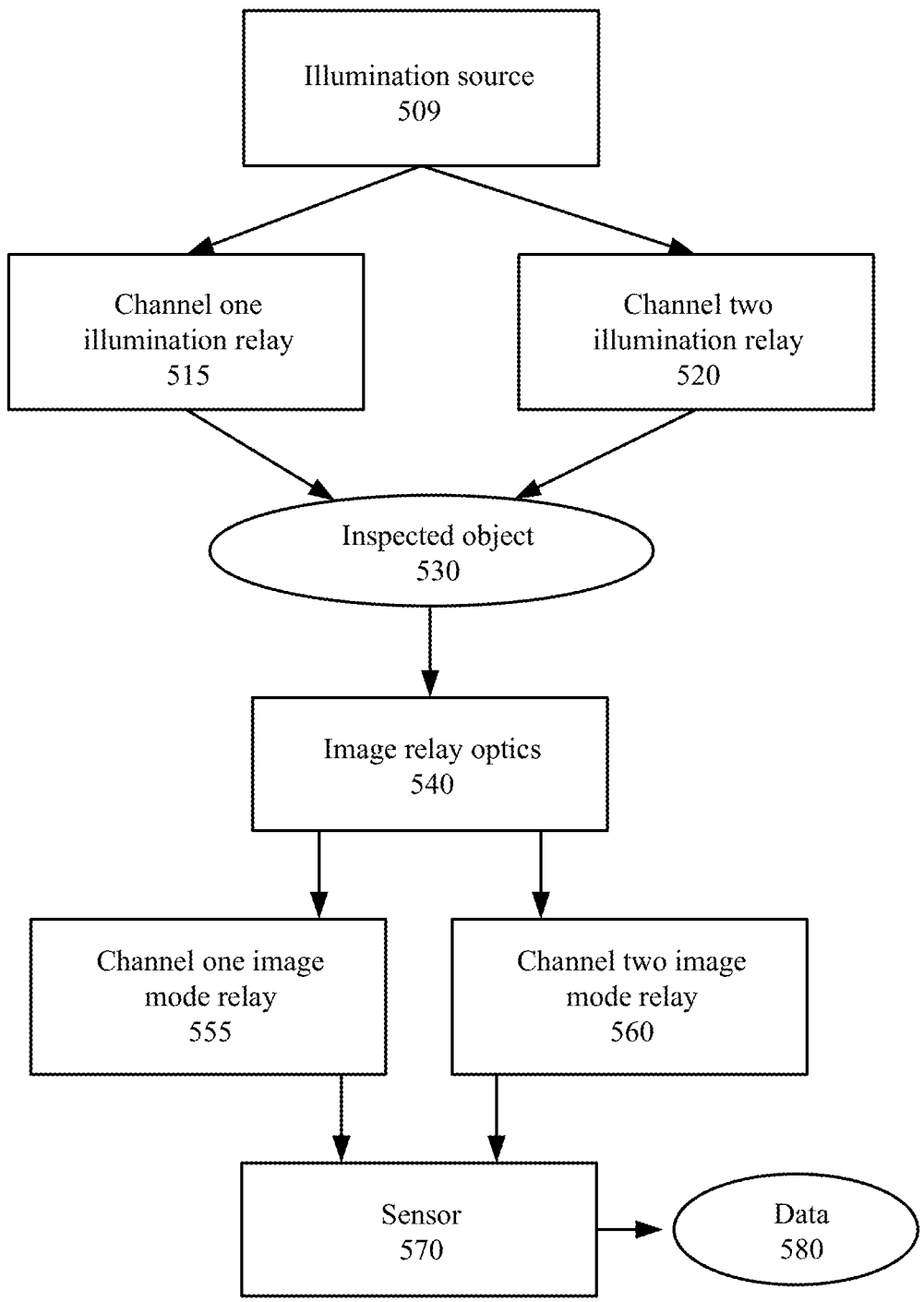
FIG. 5 illustrates an exemplary inspection system incorporating a split-readout image sensor and an illumination source comprising a DUV laser.

FIG. 5 shows a reticle, photomask or wafer inspection system 500 that simultaneously detects two channels of image or signal on one sensor 570. Image sensor 570 comprises a split-readout image sensor. Illumination source 509 incorporates a DUV laser system with bandwidth control as described herein. The operating wavelength of the DUV laser may be shorter than 200-nm, such as a wavelength of approximately 193 nm. The two channels may comprise reflected and transmitted intensity when an inspected object 530 is transparent (for example a reticle or photomask), or may comprise two different illumination modes, such as angles of incidence, polarization states, wavelength ranges or some combination thereof. The light is directed to inspected object 530 using channel one illumination relay 515 and channel two illumination relay 520.

The inspected object 530 may be a reticle, a photomask, a semiconductor wafer or other article to be inspected. Image relay optics 540 can direct the light that is reflected and/or transmitted by inspected object 530 to a channel one image mode relay 555 and to a channel two image mode relay 560. Channel one image mode relay 555 is tuned to detect the reflection or transmission corresponding to channel one illumination relay 515, whereas channel two image mode relay sensor 560 is tuned to detect the reflection or transmission corresponding to channel two illumination relay 520. Channel one image mode relay 555 and channel two image mode relay sensor 560 in turn direct their outputs to sensor 570. The data corresponding to the detected signals or images for the two channels is shown as data 590 and is transmitted to a computer (not shown) for processing.

Other details of reticle and photomask inspection systems and methods that may be configured to measure transmitted and reflected light from a reticle or photomask are described in U.S. Pat. No. 7,352,457, which issued to Kvamme et al. on Apr. 1, 2008, and in U.S. Pat. No. 5,563,702, which issued to Emery et al. on Oct. 8, 1996, both of which are incorporated by reference herein.

Additional details regarding exemplary embodiments of image sensor 570 are provided in U.S. Published Patent Application 2014/0158864, entitled "METHOD AND APPARATUS FOR HIGH SPEED ACQUISITION OF MOVING IMAGES USING PULSED ILLUMINATION", filed by Brown et al. which published on Jun. 12, 2014, and in U.S. Pat. No. 7,528,943 entitled "METHOD AND APPARATUS FOR SIMULTANEOUS HIGH-SPEED ACQUISITION OF MULTIPLE IMAGES" by Brown et al., issued May 5, 2009. These patents and patent applications are incorporated by reference herein FIG. 6A shows an exemplary pulsed laser assembly 600A that includes a fundamental laser 601 and a bandwidth narrowing apparatus 610A generally including a pulse dividing element 602A, a monolithic device 607, a frequency mixing module 608A, and various optical elements that are configured to generate sum frequency light LSF (or laser output light Lout) made up of pulses LSFP having frequencies disposed within a bandwidth that is narrower than would be created by direct second harmonic generation from fundamental laser light pulses 601A-LP generated by a fundamental laser 601.

Figure 6A:
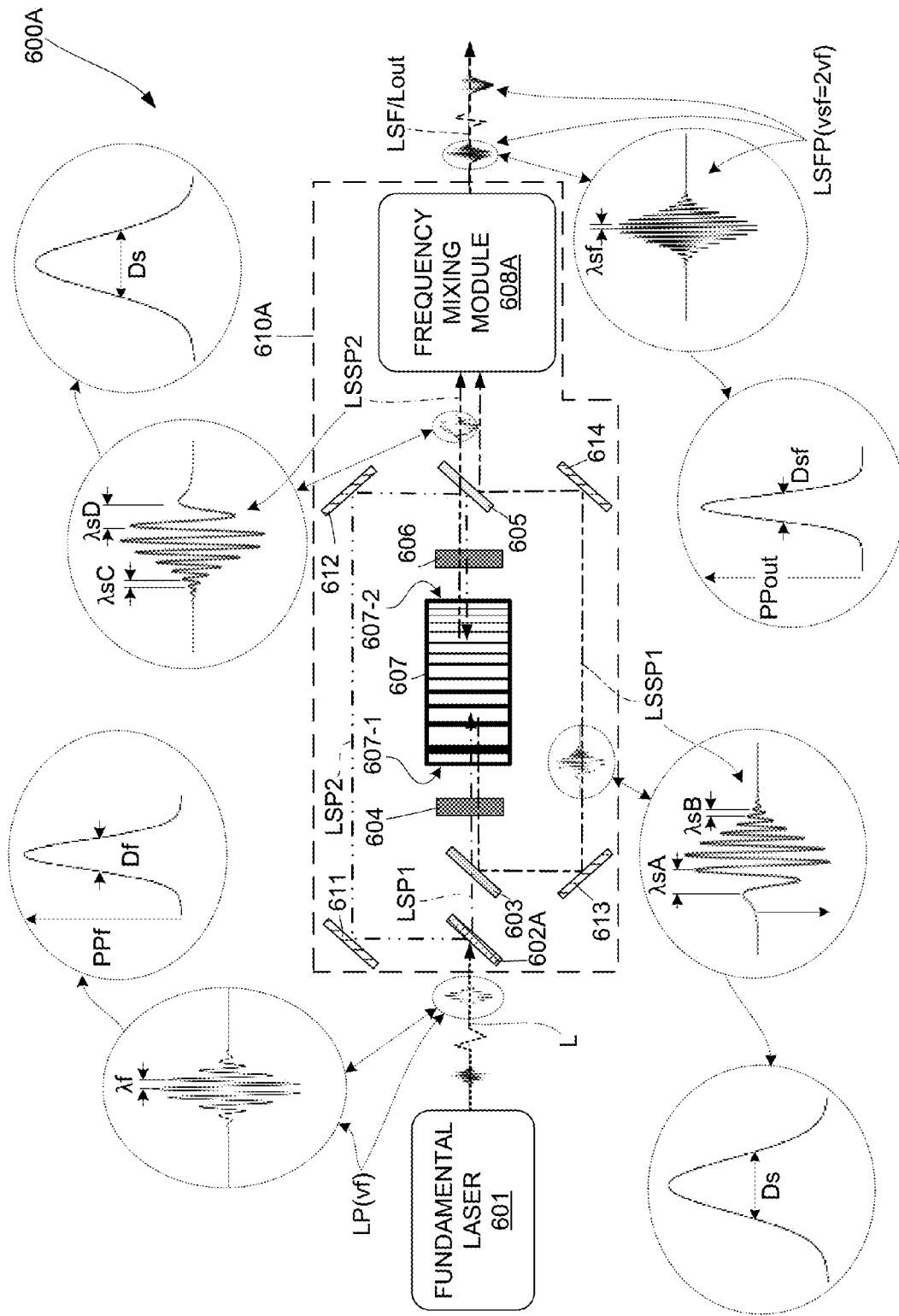
FIG. 6A illustrates one exemplary DUV laser incorporating CBG to narrow laser bandwidth.

Referring to the left side of FIG. 6A, fundamental laser 601 is configured to generate fundamental laser light L made up of a series of fundamental laser light pulses LP, where each fundamental laser light pulse LP has a fundamental center frequency $vf$ and a fundamental frequency bandwidth $\Delta vf$ (with a corresponding fundamental center wavelength $\lambda f$ and a corresponding fundamental wavelength bandwidth $\Delta \lambda f$). In one practical example, fundamental laser light pulses LP have a pulse length (duration) characterized by a full width at half maximum (FWHM) Df greater than about one picosecond, such as a FWHM pulse length between about one picosecond and about ten nanoseconds. In this example, the fundamental center frequency $vf$ may be a frequency in the near infra-red or visible part of the spectrum, such as a frequency between about 150 THz and about 750 THz (i.e. a frequency corresponding to a wavelength between about 2 μm and 400 nm). The fundamental frequency bandwidth may be characterized by a FWHM of about 1 THz or less. Typically the fundamental frequency bandwidth of laser light pulses LP will be a few to about ten times the bandwidth of a transform-limited laser pulse of the same pulse length Df. As indicated by the zigzagged feature in the dashed-line arrow between fundamental laser 601 and pulse dividing element 602, sequentially generated pulses are separated by a time period that is typically much longer than the fundamental pulse length Df. Since, as explained below, optical path lengths within laser assembly 600A are matched to about 10% or better, laser assembly 600A will function with any pulse repetition rate.

Pulse dividing element 602 is positioned to receive fundamental laser light L, and is configured to divide (split) each laser light pulse LP into two associated sub-pulses referred to below as first sub-pulse LSP1 and second sub-pulse LSP2. In the embodiment illustrated in FIG. 6A, partial reflector 602 is implemented using a partial reflector that is configured to divide each laser light pulse LP such that sub-pulses LSP1 and LSP2 have approximately equal energies, and such that the two sub-pulses are transmitted in different directions away from partial reflector 602 (e.g., as depicted in FIG. 6A, first sub-pulse LSP1 passes through partial reflector 602 and is directed horizontally to the right, and second sub-pulse LSP2 is redirected (reflected) upward from partial reflector 602). In one embodiment, partial reflector 602 may be implemented by a polarizing beam splitter that reflects one polarization, for example vertical polarization, and transmits the orthogonal polarization state, for example horizontal polarization. In this embodiment, if the fundamental laser pulses LP are polarized at an appropriate angle relative to partial reflector 602, such as at an angle of approximately 45°, then sub-pulses LSP1 and LSP2 will have approximately equal energies.

Sub-pulses LSP1 and LSP2 are directed along two different optical paths to monolithic device 607 by way of corresponding optical elements that are operably disposed between pulse dividing element 602 and monolithic device 607. As depicted by the single-dot-dashed line exiting to the right from pulse dividing element 602, first sub-pulse LSP1 passes from partial reflector 602 through a first polarizing beam splitter (PBS) 603, and is then converted into a first circularly polarized sub-pulse by way of passing through a first quarter-wave plate (QWP) 604 to a first end surface 607-1 of monolithic device 607. In contrast, as depicted by the double-dot-dashed line extending upward from pulse dividing element 602, second sub-pulse LSP2 is reflected by flat fold mirrors 611 and 612 to a second polarizing beam splitter (PBS) 605, and is then redirected horizontally to the left and converted into a second circularly polarized sub-pulse by way of passing through a second quarter-wave plate (QWP) 606 that is disposed adjacent to a second end surface 607-2 of monolithic device 607. The first and second circular-polarized sub-pulses are thus transmitted in opposite directions onto opposing surfaces of monolithic device 607.

According to an aspect of the invention, one or more monolithic devices are configured and positioned such that associated first and second circular-polarized sub-pulses are converted into stretched sub-pulses LSSP1 and LSSP2 respectively having opposing (i.e., positive and negative) chirps. In the single monolithic device embodiment shown in FIG. 6A, monolithic device 607 is configured according to known techniques such that, when reflected from surface 607-1, the first circular-polarized sub-pulse is stretched (i.e., as indicated in the bubble located in the lower left portion of FIG. 6A, such that a duration/length Ds of stretched sub-pulse LSSP1 is greater (e.g., two or more times greater) than duration Df of fundamental laser light pulse LP), and is altered to include a positive chirp (i.e., having an increasing frequency over time such that an initial wavelength λsA of stretched sub-pulse LSSP1 is longer than a later wavelength λsB of stretched sub-pulse LSSP1). Similarly, when reflected from second surface 607-2, the second circular-polarized sub-pulse is stretched and altered to include a negative chirp (i.e., as indicated in the bubble located in the upper right portion of FIG. 6A, stretched sub-pulse LSSP2 has a decreasing frequency over time such that an initial wavelength λsC of stretched sub-pulse LSSP2 is shorter than a later wavelength λsD of stretched sub-pulse LSSP2). Note that the stretching process is preferably performed such that stretched sub-pulses LSSP1 and LSSP2 have substantially the same energies as the first and second circular-polarized sub-pulses, respectively. In one embodiment, monolithic device 607 is further configured such that first positively chirped stretched sub-pulse LSSP1 and negatively chirped stretched sub-pulse LSSP2 are generated with changes in frequency with time that are approximately equal in magnitude but opposite in sign (i.e., such that positively chirped stretched sub-pulse LSSP1 is substantially a mirror image of negatively chirped stretched sub-pulse LSSP2). One advantage of reflecting the two sub-pulses from opposite ends of a single CBG or chirped fiber Bragg grating, as opposed to using two separate components for monolithic device 607, is that the monolithic device 607 will impose opposite chirps on the two sub-pulses since the pulses enter the Bragg gratings from opposite ends and travel into it in opposite directions.

Stretched sub-pulse LSSP1 and LSSP2 are then directed via corresponding optical paths from monolithic device 607 to mixing module 608A by way of corresponding optical elements. As depicted by the short-dash-long-dash line extending horizontally from first surface 607-1, first stretched sub-pulse LSSP1 passes from monolithic device 607 through QWP 604 to PBS 603, and is redirected downward from PBS 603 to fold mirror 613, from fold mirror 613 to fold mirror 614, and from fold mirror 614 upward to second polarizing beam splitter (PBS) 605, from which first stretched sub-pulse LSSP1 is redirected to the right toward frequency mixing module 608A. In contrast, as depicted by the double-short-dash-long-dash line extending horizontally to the right from second surface 607-1, second stretched sub-pulse LSSP2 passes from monolithic device 607 through QWP 606 to PBS 605, and is passed through PBS 605 to frequency mixing module 608A. Note that, after being reflected and chirped by monolithic device 607, each stretched sub-pulse LSSP1 and LSSP2 is converted back to linearly polarized light with polarization orthogonal to the incoming beam by corresponding QWPs 604 and 605. These two orthogonally polarized pulses are combined at PBS 605, and sent to a frequency mixing module 608A to generate sum frequency light FSF, which has a center frequency of 2vf. Note that the optical path lengths followed by the two sub-pulses from partial reflector 602 to where they recombine at PBS 605 are substantially equal, so that the two sub-pulses arrive at frequency mixing module 608A substantially overlapped. In a preferred embodiment the optical sub-pulse light path lengths traveled by the two sub-pulses are matched to within about 10% of the pulse length. In one embodiment the polarization of the fundamental light L may be oriented at about 45° to partial reflector 602A, which comprises a polarized beam splitter, so that substantially equal fractions of the fundamental light L are transmitted and reflected by partial reflector 602A. In this embodiment, PBS 603 should transmit the same polarization as partial reflector 602 and should efficiently reflect the orthogonal polarization. Similarly, PBS 605 reflects the polarization reflected by partial reflector 602A and directs it to QWP 606, which converts each pulse to circular polarization. After reflection from 607, QWP 606 converts the circular polarization to linear polarization, but rotated 90° with respect its initial polarization, so that it passes through PBS 605. The light reflected from PBS 603 also reflects from PBS 605, so that the two orthogonally polarized pulses travel together substantially collinearly into frequency mixing module 608A. Combining the two orthogonally polarized pulses at PBS 605A is described in additional detail below with reference to FIG. 9.

Referring to the right side of FIG. 6A, frequency mixing module 608A is configured to mix each positively-chirped stretched sub-pulse LSSP1 with its corresponding negatively chirped stretched sub-pulse LSSP2 such that mixing the two stretched sub-pulses generates sum frequency light LSF made up of pulses LSFP having center frequencies vsf equal to two times fundamental frequency vf of fundamental laser light 601-L (i.e., vsf=2vf). That is, frequency mixing module 608A is configured to generate sum frequency light pulses LSFP having an output frequency that is the sum of the frequencies of the two orthogonally polarized stretched sub-pulses LSSP1 and LSSP2, whereby sum frequency light LSF is generated as second harmonic of fundamental laser light L. Because stretched sub-pulses LSSP1 and LSSP2 are orthogonally polarized, frequency mixing module 608A is preferably configured to implement Type II frequency mixing.

Figure 11A:
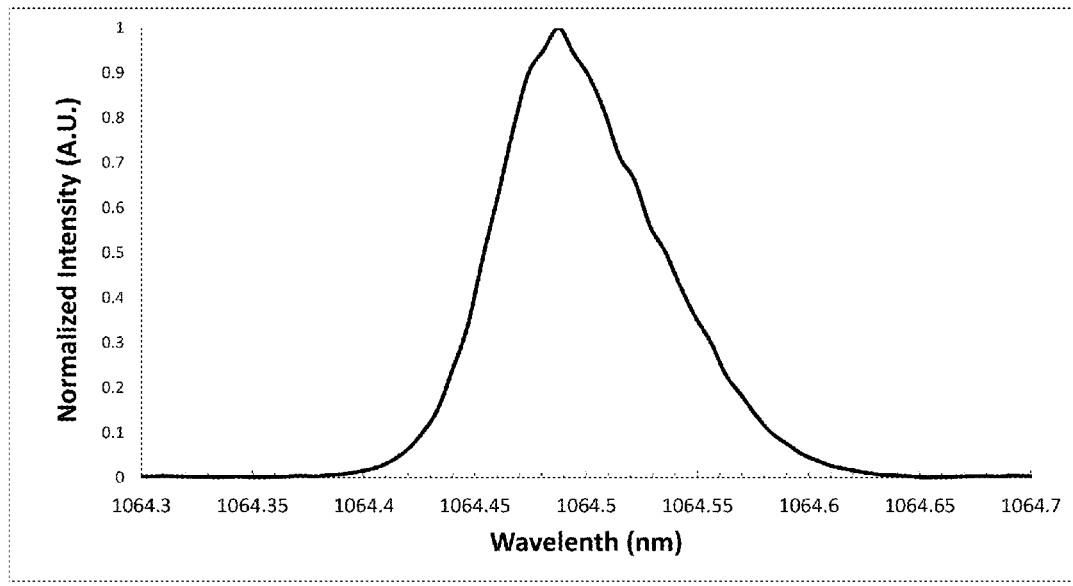
FIGS. 11A and 11B are graphs depicting an exemplary fundamental bandwidth and associated second harmonic spectrums.
Figure 11B:
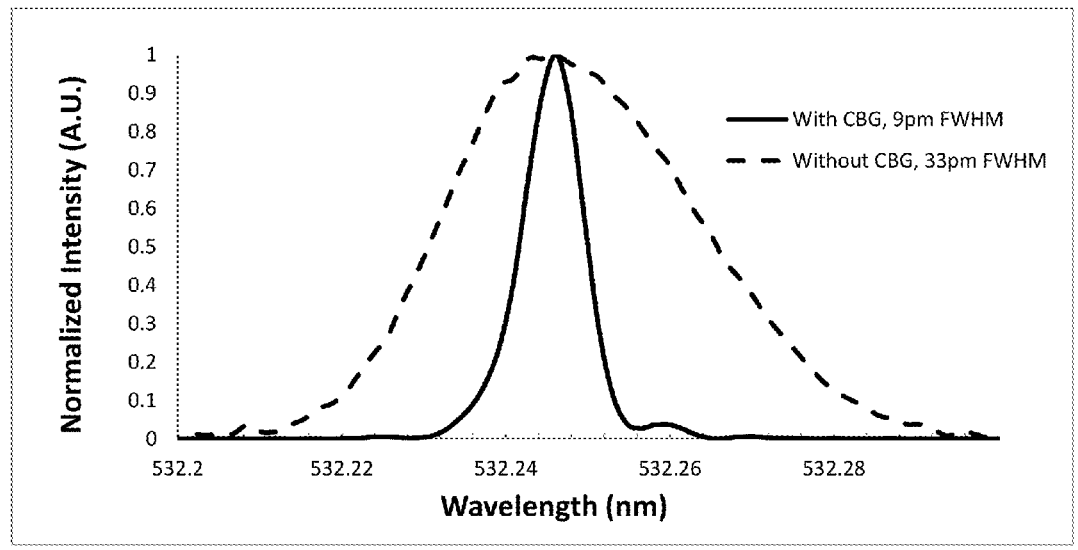

Utilizing bandwidth narrowing apparatus 610A in the manner described above and in the following examples, sum frequency light pulses LSFP are thus generated having a narrower bandwidth than could be produced without using the monolithic-device-based bandwidth narrowing apparatus 610 (i.e., by way of simply doubling the frequency of the fundamental). By way of example, FIG. 11A depicts an exemplary measured fundamental light bandwidth, which has a FWHM bandwidth of approximately 82 µm at a fundamental center wavelength of 1064.5 nm, and FIG. 11B depicts experimentally measured spectrums showing second harmonics of the fundamental light of FIG. 11A, where the dashed-line depicts a second harmonic generated by way of frequency doubling (which has a measured FWHM bandwidth of approximately 33 µm), and the solid line depicts a second harmonic generated by way of utilizing a CBG-based bandwidth narrowing apparatus according to the present invention (which has a FWHM bandwidth of approximately 9 µm). FIG. 11B clearly shows that the present invention reduces the fundamental bandwidth by a factor of about 3.7 compared with simply doubling the frequency of the fundamental. Reducing the bandwidth of a laser by 3.7× by filtering would require discarding more than 70% of the energy of each laser pulse, and so would be very inefficient.

One advantage of the exemplary embodiment illustrated in FIG. 6A is that stretched sub-pulses LSSP1 and LSSP2 travel substantially collinearly into frequency mixing module 608A, which causes the stretched sub-pulses to overlap as they travel through frequency mixing module 608A and results in efficient generation of sum frequency light LSF as a second harmonic of fundamental laser light L. Alignment of these two light paths and their alignment to frequency mixing module 608A can be relatively simple in a collinear arrangement such as that depicted in FIG. 6A.

The approach implemented by the embodiment of FIG. 6A assumes fundamental light pulses LP are close to being transform-limited. The substantially linearly chirped structure of monolithic device 607 stretches each sub-pulse with a substantially linear chirp. Pulses arriving at monolithic device 607 from one side see a grating that is chirped from low frequency (larger grating pitch) to high frequency (smaller grating pitch). Pulses arriving from the opposite side of monolithic device 607 see the opposite chirp. As the slopes of up-chirp and down-chirp closely match, sum frequency generation between these pulses produces longer, transform-limited pulses with narrower bandwidth. In case that pulses in the fundamental light L are far from transform-limited, two separate CBGs or fiber Bragg gratings with different chirp can be used in order to ensure reflected pulses acquire matched opposite chirp. Even with substantially transform-limited fundamental laser pulses, two closely matched CBGs could be used instead of a single CBG, with one CBG oriented for high-to-low chirp and the other for low-to-high chirp. The preferred embodiment of using opposite sides of a single CBG has the advantages of making the optics more compact and less expensive, and of guaranteeing that the two pulses are chirped with substantially similar slopes of chirp, but with opposite signs.

In an exemplary embodiment, fundamental laser 601 is a Nd:YAG or Nd-doped vanadate laser with a second-harmonic conversion module, and generates fundamental light L at fundamental wavelength $\lambda f$ of approximately 532 nm with a pulse length (duration) Df between a few picoseconds and a few tens of picoseconds, for example, a FWHM pulse length Df of about 20 ps. A monolithic device 607 comprising a CBG is configured to stretch the 532 nm fundamental pulses to a stretched FWHM pulse length (duration) Ds between about ten picoseconds and about one hundred picoseconds (e.g., a FWHM pulse length Ds of about 80 ps). In this case, frequency mixing module 608A is configured to generate sum frequency (output) light LSF having a wavelength $\lambda sf$ of approximately 266 nm, and having a narrower bandwidth and longer pulse length Dsf than would result from simply doubling the frequency of fundamental light L. In a specific exemplary embodiment, frequency mixing module 608A is implemented using a beta barium borate (BBO) crystal that is critically phase matched for Type II mixing of light at 532 nm at a phase-matching angle of about 82° at a temperature of about 100° C. Other temperatures can be used with an appropriate adjustment in phase matching angle. Other appropriate non-linear optical crystals could be substituted for the BBO crystal with an appropriate temperature and phase-matching angle. A periodically poled non-linear crystal with an appropriate poling period could also be substituted for the BBO crystal.

Figure 6B:
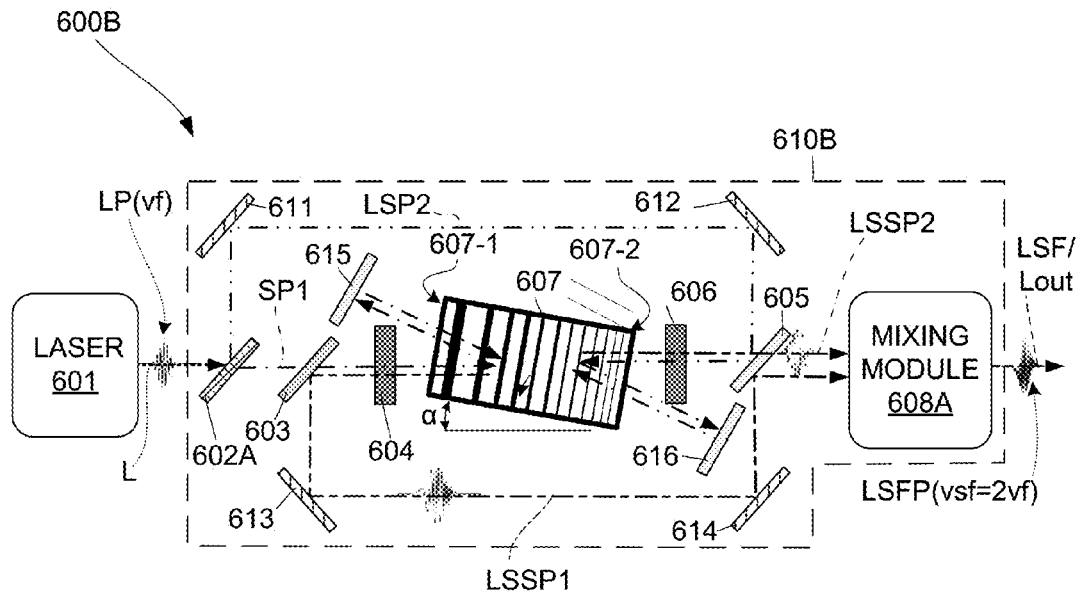
FIG. 6B illustrates an alternate exemplary DUV laser incorporating CBG to narrow laser bandwidth.

FIG. 6B shows an alternate exemplary laser assembly 600B that is similar to assembly 600A (FIG. 6A), but includes a bandwidth narrowing apparatus 610B that is modified to further stretch the sub-pulses by way of directing each sub-pulse against a corresponding surface of monolithic device 607 two times. The embodiment of FIG. 6B is similar to that of FIG. 6A except for this tilted CBG configuration, so all the other optical elements and components of laser assembly 600B having the same positioning and performing the same functions as corresponding elements/components of assembly 600A (FIG. 6A) are indicated using the same reference numbers, and will not be described in additional detail to avoid unnecessary repetition.

Referring to the central region of FIG. 6B, laser assembly 600B differs from assembly 600A in that monolithic device 607 is arranged in a tilted CBG configuration, and laser assembly 600B utilizes two additional mirrors 615 and 616. Specifically, monolithic device 607 is rotated by an angle α relative to the (horizontal) entry paths of incident sub-pulses LSP1 and LSP2 such that, as indicated, reflected sub-pulse light is respectively directed onto mirrors 615 and 616, which are disposed such that the reflected incident sub-pulses are redirected back into monolithic device 607 at corresponding angles that cause the resulting twice-reflected stretched sub-pulses LSSP1 and LSSP2 to travel back along the (horizontal) entry path to PBS's 603 and 605, respectively, from which each stretched sub-pulse is directed to frequency mixing module 608A and converted into sum frequency output light LSF in substantially the same manner as described above. Utilizing this tilted CBG configuration produces the stretched sub-pulses LSSP1 and LSSP2 that have longer pulse lengths (durations) than those generated by the embodiment of FIG. 6A, and that acquire twice the amount of chirp by way of reflecting from opposing surfaces 607-1 and 607-2 of monolithic device 607 twice. This configuration thus produces sum frequency light LSF having an even narrower bandwidth after sum frequency generation than could be generated by single reflections from the same monolithic device 607. To produce twice the pulse stretching and twice the chirp from single reflections from a monolithic device 607 would require a monolithic device 607 that is about twice as long, which might not be practical to fabricate, or might be significantly more expensive.

Figure 6C:
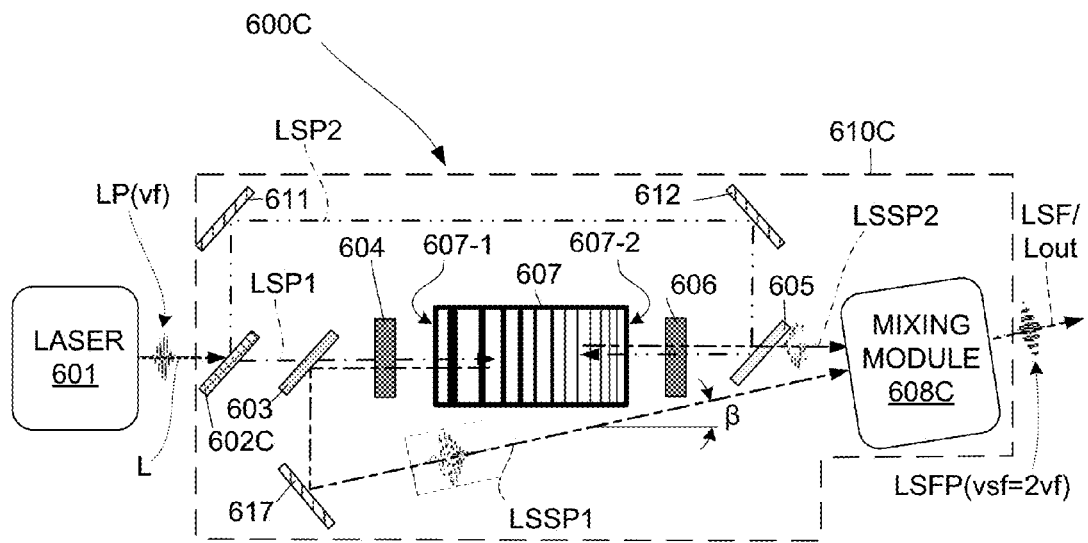
FIG. 6C illustrates an alternate exemplary DUV laser incorporating CBG to narrow laser bandwidth.

FIG. 6C shows another alternate exemplary laser assembly 600C that is also similar to assembly 600A (FIG. 6A), but differs from the above-described embodiments in that it utilizes a bandwidth narrowing apparatus 610C configured such that the sub-pulses are subject to parallel polarization (i.e., as opposed to the orthogonal polarization utilized above). Specifically, bandwidth narrowing apparatus 610C differs from the two previous embodiments in that it includes a different partial reflector (pulse dividing element) 602C, in that a single mirror 617 to reflect first stretched sub-pulse LSSP1 directly onto frequency mixing module 608C, and in that frequency mixing module 608C is configured to implement Type I frequency mixing (as opposed to Type II mixing). Otherwise, all the other optical elements and components of laser assembly 600C having the same positioning and performing the same functions as corresponding elements/components of assembly 600A (FIG. 6A) are indicated using the same reference numbers, and will not be described in additional detail to avoid unnecessary repetition.

Referring to the center of FIG. 6C, laser assembly 600C is arranged such that fundamental light pulses LP are directed onto partial reflector 602C in a manner similar to that described above, and partial reflector 602C is configured to divide (split) each laser pulse LP generated by fundamental laser 601 into two sub-pulses LSP1 and LSP2 of approximately equal energy that are subsequently directed onto opposing surfaces 607-1 and 607-2 of monolithic device 607 in a manner similar to that described above with reference to FIG. 6A. However, in this case, partial reflector 602C differs from the previous embodiments in that partial reflector 602C is configured using known techniques such that the polarizations of sub-pulses LSP1 and LSP2, which are respectively transmitted and reflected by partial reflector 602C, are substantially parallel to one another (i.e., as opposed to being orthogonally polarized). As in the above described embodiments, single monolithic device 607 imparts opposite chirps on the two sub-pulses, and QWPs 604 and 606 convert the sub-pulses from linear to circular polarization and back again such that the polarization direction of each stretched sub-pulse LSSP1 and LSSP2 is 90° rotated relative to its original polarization direction. Similar to the embodiments described above, after being reflected from second surface 607-2 of monolithic device 607, second stretched sub-pulse LSSP2 is directed through PBS 605 and into frequency mixing module 608C along a first (e.g., horizontal) direction. Also similar to the embodiments described above, first stretched sub-pulse LSSP1 leaves first surface 607-1 of monolithic device 607 traveling in a horizontal direction, and is then reflected downward by PBS 603, but the path of first stretched sub-pulse LSSP1 differs from the previous embodiments at this point in that optics 617, comprising one or more mirrors or prisms, is positioned to reflect first stretched sub-pulse LSSP1 directly onto frequency mixing module 608C at an angle β that is between 0° and less than 4° relative to the path direction of second stretched sub-pulse LSSP2 as it enters frequency mixing module 608C (i.e., relative to horizontal in FIG. 6C). As in the previous embodiments, the optical elements forming the two sub-pulse light path lengths should be substantially similar such that stretched sub-pulses LSSP1 and LSSP2 arrive at frequency mixing module 608C substantially overlapped with one another. In a preferred embodiment the optical path lengths traveled by the two pulses are matched to within about 10% of the pulse length. Combining the two pulses with parallel polarization in frequency mixing module 608C is shown in more detail in FIG. 10. Also similar to the previous embodiments, frequency mixing module 608C mixes stretched sub-pulses LSSP1 and LSSP2 to generate sum frequency output light LSF that is the sum of the frequencies of the two stretched sub-pulses. However, because the two pulses have parallel polarization, frequency mixing module 608C is preferably configured using known techniques to implement Type I frequency mixing, or configured to use quasi phase matching in a periodically poled non-linear optical crystal.

One advantage of the exemplary embodiment illustrated in FIG. 6C is that Type I frequency mixing can be used because the two pulses have substantially parallel polarization. In many non-linear crystals, Type I frequency conversion is more efficient than Type II, allowing a shorter length crystal to be used for the frequency mixing for given input and output powers, or alternatively allowing more output power to be generated for a given input power and crystal length.

Alternatively the exemplary embodiment illustrated in FIG. 6C can perform frequency mixing using quasi phase matching in a periodically poled non-linear optical crystal, which can be more efficient than either Type 1 or Type 2 frequency mixing in a non-poled nonlinear optical crystal. Periodically poled materials, such as PPLN and PPSLT, have higher non-linear coefficients than materials such as LBO, BBO and CLBO. Furthermore, the use of quasi phase matching eliminates walk-off and may allow a longer length crystal to be used for the frequency mixing.

Figure 10:
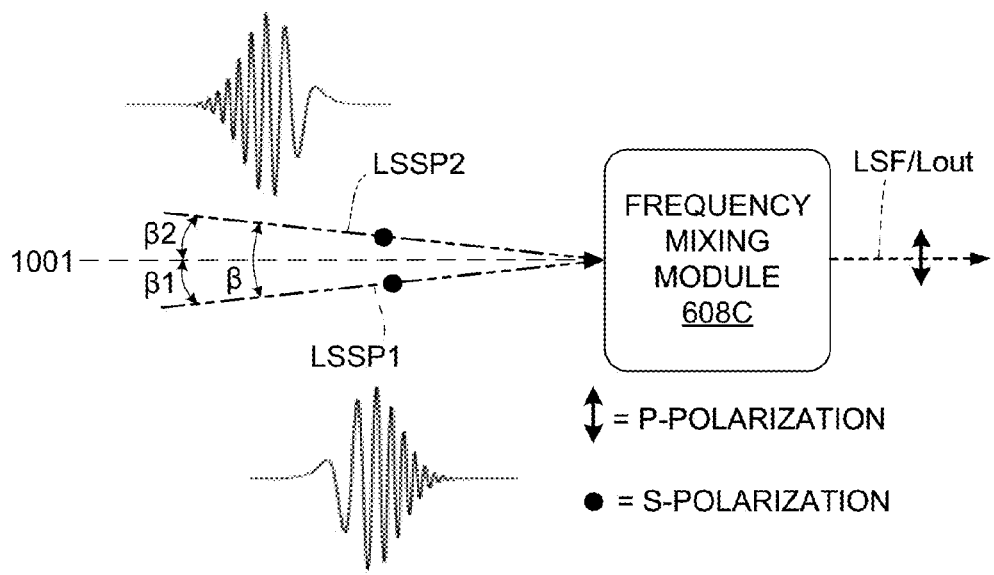
FIG. 10 illustrates an exemplary frequency mixing module for combining and generating a sum frequency from two pulses with parallel polarization.

In yet another exemplary embodiment (not shown), two pulses with substantially parallel polarizations are reflected twice from a chirped volume Bragg grating or a chirped fiber Bragg grating in a manner similar to that illustrated in FIG. 6B and then combined in a frequency mixing module 608C in manner similar to that illustrated in FIGS. 6C and 10.

Figure 7:
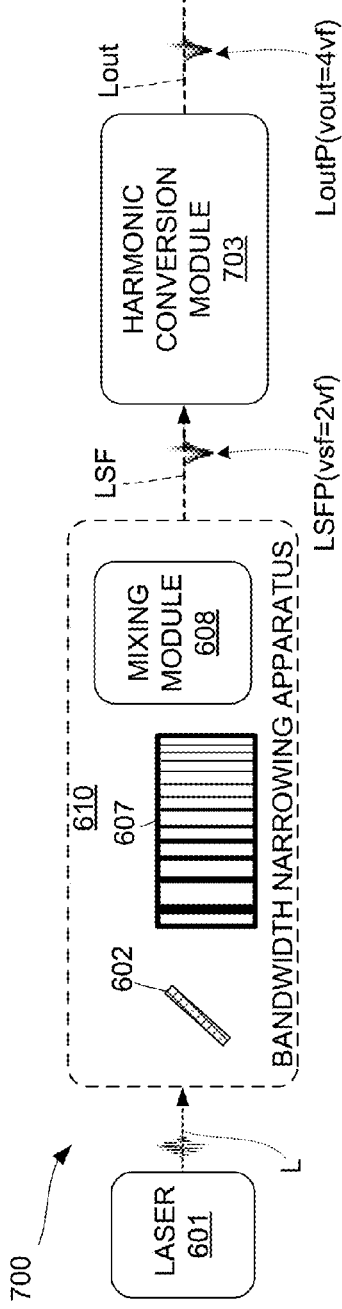
FIG. 7 illustrates another exemplary DUV laser incorporating CBG to narrow laser bandwidth.

FIG. 7 shows an exemplary DUV laser assembly 700 including a fundamental laser 601, a CBG-based bandwidth narrowing apparatus 610 and a harmonic conversion module 703 according to another embodiment of the present invention. Similar to the embodiments described above, bandwidth narrowing apparatus 610 includes a pulse dividing element 602, a monolithic device 607 and a sum frequency generation (mixing) module 608 that are configured to generate sum frequency light LSF with a reduced bandwidth (i.e., as compared with that which would be obtained by conventional frequency doubling). Harmonic conversion module 703 is positioned to receive sum frequency light LSF, and configured using known techniques to convert sum frequency light LSF into laser output light Lout having a higher harmonic at a shorter wavelength than sum frequency light LSF.

In an exemplary embodiment, the configuration of fundamental laser 601 and bandwidth narrowing apparatus 610 is similar to any one of the above described laser assemblies 600A, 600B and 600C. In one embodiment, fundamental laser 601 is a Nd:YAG or Nd-doped vanadate laser, generating fundamental light L at a wavelength of approximately 1064 nm with a pulse width of between a few picoseconds and a few tens of picoseconds, for example of pulse length of about 20 ps.

As in the above-described embodiment, monolithic device 607 functions to stretch the fundamental (e.g., 1064 nm) pulses to a pulse length between a few tens of picoseconds and a few hundred picoseconds, for example to a length of about 80 ps, and frequency mixing module 608 functions to generate sum frequency light LSF at a wavelength of approximately 532 nm. Frequency mixing module 608 can use Type II frequency mixing in lithium triborate (LBO) or cesium lithium borate (CLBO). For example, LBO can be used for Type II frequency mixing of light at a wavelength of about 1064 nm to generate light at a wavelength of about 532 nm using the YZ plane at a temperature of about 50° C. and phase matching angles of approximately θ=23° and φ=90°. Alternatively frequency mixing module 608 can use a periodically poled SLT crystal.

In one embodiment, harmonic conversion module 703 is configured to convert the sum frequency light LSF into laser output light Lout comprising pulses LoutP at the fourth harmonic of fundamental light L (e.g., having a wavelength of approximately 266 nm). Harmonic conversion module 703 may include a CLBO crystal which can be critically phase matched for Type I generation of the second harmonic of 532 nm at a phase-matching angle of about 61.8° at a temperature of about 100° C. Other temperatures can be used with an appropriate adjustment of the phase-matching angle. CLBO is particularly useful when a high power (such as 500 mW or more) of output light at 266 nm is needed as CLBO can have a higher damage threshold than other materials at DUV wavelengths. Annealed, deuterium-treated or hydrogen-treated CLBO crystals are preferred for power levels of about 1 W or higher at DUV wavelengths. More information on annealed, deuterium-treated and hydrogen-treated CLBO can be found in U.S. Published Patent Application 2015/0007765 entitled "CLBO Crystal Growth" by Dribinski and published on Jan. 8, 2015, U.S. Pat. No. 8,873,596 entitled "Laser With High Quality, Stable Output Beam, And Long Life High Conversion Efficiency Non-Linear Crystal" by Dribinski et al., issued Oct. 28, 2014, U.S. Published Patent Application 2013/0088706 entitled "Hydrogen Passivation of Nonlinear Optical Crystals" by Chuang et al. published on Apr. 11, 2013, and U.S. Published Patent Application 2014/0305367 entitled "Passivation of Nonlinear Optical Crystals" by Chuang et al. published on Oct. 16, 2014. All of these patent and/or patent applications are incorporated by reference herein.

Figure 8:
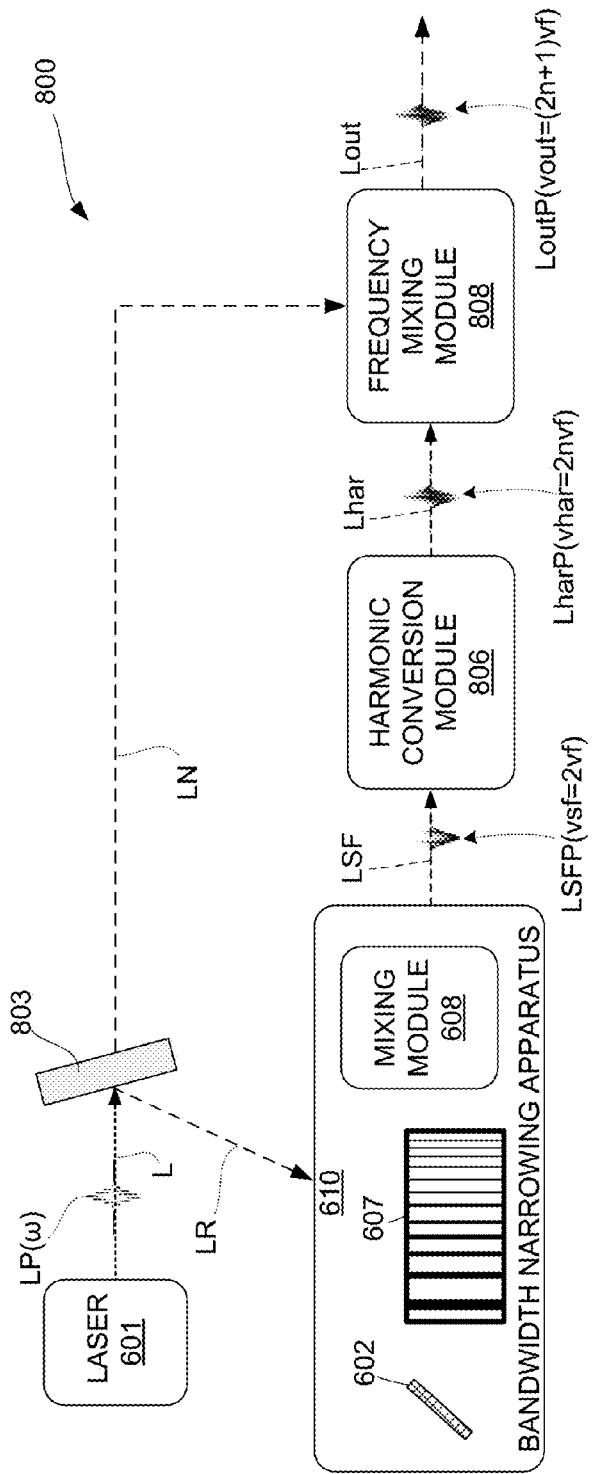
FIG. 8 illustrates another exemplary DUV laser incorporating CBG to narrow laser bandwidth.

FIG. 8 shows another exemplary DUV laser assembly 800 including a fundamental laser 601, a CBG-based bandwidth narrowing apparatus 610, a harmonic conversion module 806 and a second frequency mixing module 808 that are configured to generate UV output light according to another embodiment of the present invention. The bandwidth of the fundamental light L is narrowed by passing through an etalon (or other optical bandwidth filtering device) 803, which, for example, transmits a narrow range of wavelengths within the laser bandwidth. The narrowed fundamental light LN is used as one of the inputs into frequency mixing module 808. The out-of-band rejected fundamental LR, which, for example, is reflected by etalon 803, has a broader bandwidth and a dip in the middle of its spectrum compared with the narrowed fundamental LN. Rejected light LR, which would otherwise be wasted, is used as the input fundamental light CBG-based bandwidth narrowing apparatus 610, which includes a pulse dividing element 602, a monolithic device 607 and a mixing module 608 in a configuration similar to any of those described above with reference to FIGS. 6A, 6B and 6C. The generated sum frequency light LSF has a narrower bandwidth than would result from direct sum frequency generation without monolithic device 607, which subsequently leads to a narrower bandwidth harmonic light Lhar generated by harmonic conversation module 806. The laser output light Lout is generated by mixing the narrowed fundamental light LN and the narrowed harmonic light Lhar in frequency mixing module 808.

In an exemplary embodiment, fundamental laser 601 generates fundamental light pulses LP having a fundamental wavelength of approximately 1064 nm using, for example, a Nd:YAG or Nd-doped vanadate laser. Sum frequency light LSF is generated with pulses LSFP having wavelengths of approximately 532 nm is generated using bandwidth narrowing apparatus 610. Harmonic conversion module 806 converts it into the harmonic light Lhar at a wavelength of approximately 266 nm. Frequency mixing module 808 produces laser output light Lout at a wavelength of approximately 213 nm by mixing the narrowed fundamental light LN at a wavelength of approximately 1064 nm, and the narrowed harmonic light Lhar at a wavelength of approximately 266 nm. In a preferred embodiment, one or both of harmonic conversion module 806 and frequency mixing module 808 include a CLBO crystal, an annealed CLBO crystal, a deuterium-treated CLBO crystal or a hydrogen-treated CLBO crystal.

Figure 9:
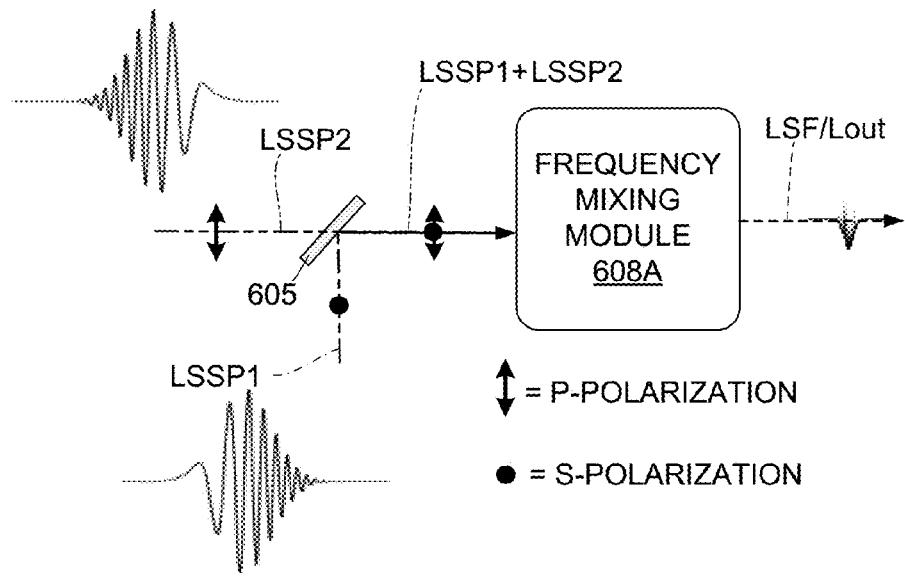
FIG. 9 illustrates an exemplary frequency mixing module for combining and generating a sum frequency from two orthogonally polarized pulses.

FIG. 9 illustrates an exemplary frequency mixing module 608A configured to combine (mix) oppositely chirped stretched sub-pulses LSSP1 and LSSP2 having orthogonal polarization, and to generate sum frequency light LSF from these two pulses in a manner introduced above with reference to FIGS. 6A and 6B. PBS 605 combines the two orthogonally polarized sub-pulses LSSP1 and LSSP2 that have opposite chirp so that they travel substantially collinearly into frequency mixing module 608A. Frequency mixing module 608A generates the second harmonic by summing the frequencies of stretched sub-pulses LSSP1 and LSSP2 in a non-linear crystal using, preferably, Type II frequency conversion. Depending on the wavelength and power level of the fundamental light, suitable non-linear crystals for Type II frequency mixing may include BBO, Lithium-Triborate (LBO), Cesium Lithium Borate (CLBO) and periodically poled materials such lithium niobate, stoichiometric lithium tantalate, and Mg-doped stoichiometric lithium tantalate.

FIG. 10 illustrates an exemplary frequency mixing module 608C configured to combine (mix) oppositely chirped stretched sub-pulses LSSP1 and LSSP2 having parallel polarization, and to generate sum frequency light LSF from these two pulses in a manner introduced above with reference to FIG. 6C. As described above, the two oppositely chirped stretched sub-pulses are directed to frequency mixing module 608C so that they converge and overlap inside frequency mixing module 608C, which in this embodiment is implemented by a non-linear crystal configured for frequency summation. The directions of travel of stretched sub-pulses LSSP1 and LSSP2 should be at substantially equal angles 131 and 132 on opposite side of the direction of optimum phase matching (1001) of the non-linear crystal so that the sum-frequency second harmonic will travel substantially along the optimum phase matching direction 1001. The angle 131 between the direction of stretched sub-pulse LSSP1 and optimum phase matching direction 1001 should be large enough that each pulse arrives at the non-linear crystal outside of the acceptance angle for second harmonic generation, so that only a minimal fraction of the individual pulses are converted to the second harmonic. Similarly for the angle 132 between the direction of stretched sub-pulse LSSP2 and optimum phase matching direction 1001. The acceptance angle for second harmonic generation depends on the crystal material, the crystal length and the wavelengths of LSSP1, LSSP2 and LSF. However the angle β between stretched sub-pulses LSSP1 and LSSP2 should not be so large as to result in only a small region within the non-linear crystal where the two pulses can overlap and generate a sum frequency. In one preferred embodiment using a 30 mm long PPSLT crystal to generate sum frequency light at a wavelength of 532 nm, the angle 131 between the direction of stretched sub-pulse LSSP1 and optimum phase matching direction 1001 (and the angle β2 between the direction of stretched sub-pulse LSSP2 and optimum phase matching direction 1001) is about 1°, i.e. the angle β between stretched sub-pulses LSSP1 and LSSP2 is about 2°.

Depending on the wavelength and power level of the fundamental light, suitable non-linear crystals for Type I frequency mixing may include BBO, LBO, CLBO and periodically poled materials such lithium niobate, stoichiometric lithium tantalate, and Mg-doped stoichiometric lithium tantalate. Note that with periodically poled crystals, the polarization of the sum frequency light LSF may be either perpendicular (as shown) or parallel to the polarization of the input pulses LSSP1 and LSSP2 depending on the material and quasi phase matching used.

The above exemplary embodiments describe lasers that generate an output wavelength corresponding to an integer harmonic of the fundamental. The bandwidth narrowing apparatuses and methods disclosed herein can be used in lasers that generate output frequencies that are not an integer harmonic of the fundamental. For example, a laser may generate an output wavelength by mixing a harmonic of the fundamental laser with another wavelength, such as one generated by an optical parametric oscillator, optical parametric amplifier or Raman laser pumped by a portion of the fundamental. In such a laser, the bandwidth of the harmonic may be narrowed using an apparatus or method disclosed herein, thus resulting in a narrower output bandwidth.

For example a laser can generate an output wavelength between about 180 nm and about 200 nm, such as a wavelength near 193 nm, by mixing the fifth harmonic of a fundamental near 1064 nm with an infra-red wavelength between about 1.1 µm and about 3.3 µm. More detailed descriptions of lasers generating wavelengths near 193 nm that can benefit from incorporating the bandwidth-controlling apparatus and methods described herein are described in U.S. Pat. No. 8,755,417 entitled "Coherent light generation below about 200 nm" to Dribinski, and in U.S. Published Patent Application 2013/0077086, entitled "Solid-State Laser and Inspection System Using 193 nm Laser" by Chuang et al. published on Mar. 28, 2013 (now abandoned), U.S. Published Patent Application 2013/0313440, entitled "Solid-state laser and inspection system using 193 nm laser" by Chuang et al. published on Nov. 28, 2013, U.S. Pat. No. 8,929,406 entitled "193 nm laser and inspection system" by Chuang et al. U.S. Published Patent Application 2014/0226140, entitled "193 nm Laser And Inspection System" by Chuang et al. published on Aug. 14, 2014, Ser. No. 14/210,355, entitled "A 193 nm Laser and an Inspection System Using a 193 nm Laser" and filed by Chuang et al. on Mar. 13, 2014. All of these patents and applications are incorporated by reference herein.

Note that the above described 193 nm lasers can be operated at other wavelengths shorter than about 200 nm by appropriate selection of the fundamental wavelength, the wavelength of the signal light, and appropriate changes to frequency mixing modules within the laser. In particular vacuum UV wavelengths shorter than 190 nm can be generated by such lasers. Lasers capable of generating wavelengths shorter than about 200 nm are also described in U.S. Provisional Patent Application 62/059,368 by Chuang et al., entitled "183 nm laser and inspection system" and filed on Oct. 3, 2014. This provisional application is incorporated by reference herein. The bandwidth reduction apparatus and methods described herein may be used in lasers described in this provisional application.

Exemplary embodiments of image sensors suitable for use in an inspection or imaging system incorporating any of the lasers described herein can be found in US Published Patent Application 2013/0264481 entitled "Back-Illuminated Sensor with Boron Layer" by Chern et al., which published on Oct. 10, 2013 and is incorporated by reference herein.

The various embodiments of the structures and methods of this invention that are described above are illustrative only of the principles of this invention and are not intended to limit the scope of the invention to the particular embodiments described. For example, different harmonic conversion schemes and/or different non-linear crystals could be used. In another example, additional mirrors, prisms or other optical components may be used to direct laser pulses within a laser assembly and to adjust optical path lengths so as to be appropriately matched where needed.

The invention claimed is:

1. A laser assembly comprising:
   a fundamental laser configured to generate laser light pulses having a fundamental frequency disposed within a fundamental frequency bandwidth;
   a pulse dividing element configured to divide each laser light pulse into a pair of corresponding sub-pulses including a first sub-pulse and a second sub-pulse;
   at least one monolithic device configured such that the first sub-pulse of each pair of corresponding sub-pulses is converted into a first stretched sub-pulse having a positive chirp, and configured such that the second sub-pulse of each pair of corresponding sub-pulses is converted into a second stretched sub-pulse having a negative chirp; and
   a frequency mixing module configured to mix each first stretched sub-pulse with its corresponding said second stretched sub-pulse such that said mixing generates sum frequency light including sum frequency pulses having frequencies equal to two times the fundamental frequency.

2. The laser assembly of claim 1, wherein said at least one monolithic device comprises one of a chirped volume Bragg grating and a chirped fiber Bragg grating.

3. The laser assembly of claim 1, wherein the pulse dividing element is configured to divide each pulse such that the two sub-pulses have approximately equal energy.

4. The laser assembly of claim 3, wherein said at least one monolithic device is further configured such that the first stretched sub-pulse and the second stretched sub-pulse have changes in frequency with time that are approximately equal in magnitude but opposite in sign.

5. The laser assembly of claim 3,
   wherein said at least one monolithic device comprises a single monolithic device including one of a chirped volume Bragg grating and a chirped fiber Bragg grating, and
   wherein the laser assembly further comprises a plurality of optical elements operably disposed between the pulse dividing element and said single monolithic device and between said single monolithic device and said frequency mixing module, said plurality of optical elements being configured to direct said first and second sub-pulses onto opposing surfaces of said single monolithic device, and to direct said first and second stretched sub-pulse from said opposing surfaces of said single monolithic device to said frequency mixing module.

6. The laser assembly of claim 5,
   wherein said pulse dividing element and said plurality of optical elements are configured such that the first and second stretched sub-pulses have substantially orthogonal polarizations upon entering the frequency mixing module, and are directed into the frequency mixing module along collinear paths, and wherein the frequency mixing module is configured to conduct Type II frequency mixing on said first and second stretched sub-pulses.

7. The laser assembly of claim 5, wherein said laser assembly is configured such that said sum frequency pulses have wavelengths equal to one of approximately 532 nm and approximately 266 nm.

8. The laser assembly of claim 5, wherein said laser assembly is configured such that each said sum frequency pulse comprises a second harmonic of the fundamental frequency, and
wherein the laser assembly further comprises a harmonic conversion module configured to convert the sum frequency light into output light having a higher harmonic of the fundamental frequency, said higher harmonic being greater than the second harmonic of the sum frequency light.

9. The laser assembly of claim 8, wherein said laser assembly is further configured such that said output light having said higher harmonic comprises pulses having wavelengths of approximately 213 nm.

10. The laser assembly of claim 5,
wherein said pulse dividing element and said plurality of optical elements are configured such that the first and second stretched sub-pulses have substantially parallel polarizations upon entering the frequency mixing module, and are directed into the frequency mixing module in corresponding non-parallel directions separated by an angle of less than 4°, and
wherein the frequency mixing module is configured to conduct Type I frequency mixing on said first and second stretched sub-pulses.

11. A laser assembly comprising:
a fundamental laser configured to generate fundamental light including light pulses having fundamental wavelengths within a fundamental wavelength bandwidth;
an optical bandwidth filtering device configured to redirect a first portion of each fundamental light pulse having frequencies disposed outside of a narrowed frequency bandwidth, and configured to pass a second portion from each fundamental light pulse disposed within the narrowed frequency bandwidth;
a bandwidth narrowing apparatus including:
a pulse dividing element configured to divide the first portion of each laser light pulse into a pair of corresponding sub-pulses including a first sub-pulse and a second sub-pulse;
at least one monolithic device configured such that the first sub-pulse of each pair of corresponding sub-pulses is converted into a first stretched sub-pulse having a positive chirp, and configured such that the second sub-pulse of each pair of corresponding sub-pulses is converted into a second stretched sub-pulse having a negative chirp; and
a first frequency mixing module configured to mix each first stretched sub-pulse with its corresponding said second stretched sub-pulse such that said mixing generates sum frequency light including sum frequency pulses having frequencies equal to two times the fundamental frequency; and
a second frequency mixing module configured to mix one of the sum frequency light and a harmonic of the sum frequency light with one of the second portion of the fundamental light and a harmonic of said second portion such that said mixing generates ultraviolet (UV) laser output light.

12. The laser assembly of claim 11, wherein said at wherein said at least one monolithic device comprises at least one of a chirped volume Bragg grating and a chirped fiber Bragg grating.

13. The laser assembly of claim 11, wherein the pulse dividing element is configured to divide each pulse such that the two sub-pulses have approximately equal energy.

14. The laser assembly of claim 13, wherein said at least one monolithic device is further configured such that the first stretched sub-pulse and the second stretched sub-pulse have changes in frequency with time that are approximately equal in magnitude but opposite in sign.

15. The laser assembly of claim 13,
wherein said at least one monolithic device comprises a single monolithic device including one of a chirped volume Bragg grating and a chirped fiber Bragg grating, and
wherein the bandwidth narrowing apparatus further comprises a plurality of optical elements operably disposed between the pulse dividing element and said single monolithic device and between said single monolithic device and said frequency mixing module, said plurality of optical elements being configured to direct said first and second sub-pulses onto opposing surfaces of said single monolithic device, and to direct said first and second stretched sub-pulse from said opposing surfaces of said single monolithic device to said frequency mixing module.

16. The laser assembly of claim 15, wherein the fundamental laser is configured such that said light pulses of said fundamental light are longer than one picosecond.

17. The laser assembly of claim 16, wherein the fundamental laser comprises a fiber laser, a Nd:YAG laser or a Nd-doped vanadate laser.

18. The laser assembly of claim 16, wherein said laser assembly is configured such that each said sum frequency pulse comprises a wavelength of approximately 213 nm.

19. The laser assembly of claim 16,
wherein said pulse dividing element and said plurality of optical elements are configured such that the first and second stretched sub-pulses have substantially orthogonal polarizations upon entering the frequency mixing module, and are directed into the frequency mixing module along collinear paths, and
wherein the frequency mixing module is configured to conduct Type II frequency mixing on said first and second stretched sub-pulses.

20. The laser assembly of claim 16,
wherein said pulse dividing element and said plurality of optical elements are configured such that the first and second stretched sub-pulses have substantially parallel polarizations upon entering the frequency mixing module, and are directed into the frequency mixing module in corresponding non-parallel directions separated by an angle of less than 4°, and
wherein the frequency mixing module is configured to conduct Type I frequency mixing on said first and second stretched sub-pulses.

21. A system for inspecting a sample, the system comprising:
an illumination source comprising a UV laser assembly configured to generate UV radiation; and
optics, including an objective lens, configured to direct and focus the UV radiation onto the sample, and configured to collect, direct and focus a portion of the UV radiation redirected from the sample to a detector;

wherein the UV laser assembly comprises:
- a fundamental laser configured to generate laser light pulses having fundamental frequency disposed within a fundamental frequency bandwidth; and
- a bandwidth narrowing apparatus including:
  - a pulse dividing element configured to divide each laser light pulse into a pair of corresponding sub-pulses including a first sub-pulse and a second sub-pulse;
  - at least one monolithic device configured such that the first sub-pulse of each pair of corresponding sub-pulses is converted into a first stretched sub-pulse having a positive chirp, and configured such that the second sub-pulse of each pair of corresponding sub-pulses is converted into a second stretched sub-pulse having a negative chirp; and
  - a frequency mixing module configured to mix each first stretched sub-pulse with its corresponding said second stretched sub-pulse such that said mixing generates sum frequency light including sum frequency pulses having frequencies equal to two times the fundamental frequency.

22. The system of claim 21,
wherein said at least one monolithic device comprises a single monolithic device including one of a chirped volume Bragg grating and a chirped fiber Bragg grating, and
wherein the bandwidth narrowing apparatus further comprises a plurality of optical elements operably disposed between the pulse dividing element and said single monolithic device and between said single monolithic device and said frequency mixing module, said plurality of optical elements being configured to direct said first and second sub-pulses onto opposing surfaces of said single monolithic device, and to direct said first and second stretched sub-pulse from said opposing surfaces of said single monolithic device to said frequency mixing module.

23. The inspection system of claim 22,
wherein said pulse dividing element and said plurality of optical elements are configured such that the first and second stretched sub-pulses have substantially orthogonal polarizations upon entering the frequency mixing module, and are directed into the frequency mixing module along collinear paths, and
wherein the frequency mixing module is configured to conduct Type II frequency mixing on said first and second stretched sub-pulses.

24. The system of claim 21, wherein the fundamental laser is configured to generate a fundamental wavelength of approximately 1064 nm, and wherein the UV laser assembly is configured to generate a laser output light having a wavelength equal to one of approximately 266 nm and approximately 213 nm for illuminating the sample.

25. The system of claim 21, wherein the detector includes a one-dimensional or two-dimensional image sensor, the sensor including a semiconductor membrane, the semiconductor membrane including circuit elements formed on a first surface of the semiconductor membrane and a pure boron layer deposited on a second surface of the semiconductor membrane.

26. The inspection system of claim 25, wherein the image sensor further comprises an electron bombarded image sensor or an avalanche image sensor.

27. The inspection system of any of claim 21, wherein the optics focuses the UV light into a line on the sample.

* * * * *